US012795721B2

(12) United States Patent
Chisci et al.

(10) Patent No.: US 12,795,721 B2
(45) Date of Patent: Nov. 10, 2026

(54) REDUCED SENSING TIME CONFIGURATIONS FOR LISTEN-BEFORE-TALK (LBT)

(71) Applicant: QUALCOMM Incorporated, San Diego, CA (US)

(72) Inventors: Giovanni Chisci, San Diego, CA (US); Jing Sun, San Diego, CA (US); Siyi Chen, Beijing (CN); Arumugam Chendamarai Kannan, San Diego, CA (US); Vinay Chande, San Diego, CA (US); Changlong Xu, Beijing (CN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 18/567,099

(22) PCT Filed: Aug. 16, 2021

(86) PCT No.: PCT/CN2021/112713

§ 371 (c)(1),
(2) Date: Dec. 5, 2023

(87) PCT Pub. No.: WO2023/019388

PCT Pub. Date: Feb. 23, 2023

(65) Prior Publication Data

US 2024/0267947 A1 Aug. 8, 2024

(51) Int. Cl.
*H04W 74/0808* (2024.01)
*H04W 72/1268* (2023.01)
(Continued)

(52) U.S. Cl.
CPC ... *H04W 74/0808* (2013.01); *H04W 72/1268* (2013.01); *H04W 72/232* (2023.01); *H04W 74/006* (2013.01)

(58) Field of Classification Search
CPC ........... H04W 74/0808; H04W 74/006; H04W 72/232; H04W 72/1268
See application file for complete search history.

(56) References Cited

U.S. PATENT DOCUMENTS 9,763,225 B2 * 9/2017 Ji ...................... H04W 72/1215
10,736,140 B2 * 8/2020 Park .................. H04W 72/0446
(Continued)

FOREIGN PATENT DOCUMENTS

CN 112567877 A 3/2021
WO WO-2021118743 A1 * 6/2021 ............ H04W 72/23

OTHER PUBLICATIONS

Intel, et al., "Way Forward on the UL Burst Duration Indication", 3GPP TSG-RAN WG1 #86, 3GPP Draft, R1-168361 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, 3 Pages, Aug. 28, 2016 (Aug. 28, 2016), XP051144349, slide 2.
(Continued)

*Primary Examiner* — Matthew E Heneghan
(74) *Attorney, Agent, or Firm* — Harrity & Harrity, LLP

(57) ABSTRACT

A method of wireless communication performed by a user equipment (UE) may include: receiving, from a base station (BS), first downlink control information (DCI) scheduling an uplink (UL) communication; receiving, from the BS, a request to perform a clear channel assessment (CCA) associated with a first CCA timing configuration; performing, based on an indication to change to a second CCA timing configuration different from the first CCA timing configuration, the CCA based on the second CCA timing configuration; and transmitting, to the BS based on the CCA, the UL communication.

30 Claims, 11 Drawing Sheets

(51) Int. Cl.
*H04W 72/232* (2023.01)
*H04W 74/00* (2009.01)

(56) References Cited

U.S. PATENT DOCUMENTS

| | | | | |
|---|---|---|---|---|
| 11,490,417 | B2 * | 11/2022 | Talarico | H04W 72/1273 |
| 11,910,433 | B2 * | 2/2024 | Li | H04W 74/0816 |
| 12,193,053 | B2 * | 1/2025 | Niu | H04W 74/0808 |
| 2016/0309354 | A1 | 10/2016 | Yerramalli et al. | |
| 2021/0084683 | A1 | 3/2021 | Li et al. | |
| 2021/0185719 | A1 | 6/2021 | Xue et al. | |
| 2023/0189020 | A1 * | 6/2023 | Calcev | H04W 72/21<br>370/329 |

OTHER PUBLICATIONS

International Search Report and Written Opinion—PCT/CN2021/112713—ISA/EPO—Feb. 9, 2022.

Intel, et al., "Way Forward on the UL Burst Duration Indication", 3GPP TSG-RAN WG1 #86, R1-168361, Gothenburg, Sweden, Aug. 22-26, 2016, 3 Pages.

* cited by examiner

REDUCED SENSING TIME CONFIGURATIONS FOR LISTEN-BEFORE-TALK (LBT)

CROSS-REFERENCE TO RELATED APPLICATIONS

The present application is a 35 U.S.C. 371 National Phase entry of Patent Cooperation Treaty (PCT) Application No. PCT/CN2021/112713, filed Aug. 16, 2021, which is hereby expressly incorporated herein by reference in its entirety.

TECHNICAL FIELD

This application relates to wireless communication systems, and more particularly to performing listen-before-talk (LBT) for communications over a shared radio frequency band (e.g., in a shared spectrum or in an unlicensed spectrum).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

As use cases and diverse deployment scenarios continue to expand in wireless communication, spectrum sharing technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a user equipment (UE) includes: receiving, from a base station (BS), first downlink control information (DCI) scheduling an uplink (UL) communication; receiving, from the BS, a request to perform a clear channel assessment (CCA) associated with a first CCA timing configuration, performing, based on an indication to change to a second CCA timing configuration different from the first CCA timing configuration, the CCA based on the second CCA timing configuration; and transmitting, to the BS based on the CCA, the UL communication.

According to another aspect of the present disclosure, a method of wireless communication performed by a user equipment (UE) includes: receiving, from a base station (BS), first downlink control information (DCI) scheduling an uplink (UL) communication; refraining, based on an absence of a channel access parameter in the first DCI, from performing a clear channel assessment (CCA); and transmitting, to the BS over a shared frequency band, the UL communication without performing the CCA.

According to another aspect of the present disclosure, a method of wireless communication performed by a base station (BS) includes: transmitting, to a user equipment (UE), an indication of a first clear channel assessment (CCA) timing configuration; transmitting, to the UE, first downlink control information (DCI) scheduling an uplink (UL) communication; transmitting, to the UE, a request to perform a CCA associated with a second CCA timing configuration; and receiving, from the UE, the UL communication in a time resource, wherein the time resource is associated with the first CCA timing configuration.

According to another aspect of the present disclosure, a user equipment (UE) includes: a transceiver; and a processor in communication with the transceiver and configured to: cause the transceiver to: receive, from a base station (BS), first downlink control information (DCI) scheduling an uplink (UL) communication; receive, from the BS, a request to perform a clear channel assessment (CCA) associated with a first CCA timing configuration, perform, based on an indication to change to a second CCA timing configuration different from the first CCA timing configuration, the CCA based on the second CCA timing configuration; and cause the transceiver to: transmit, to the BS based on the CCA, the UL communication.

According to another aspect of the present disclosure, a user equipment (UE) includes: a transceiver; and a processor in communication with the transceiver and configured to: cause the transceiver to receive, from a base station (BS), first downlink control information (DCI) scheduling an uplink (UL) communication; refrain, based on an absence of a channel access parameter in the first DCI, from performing a clear channel assessment (CCA); and cause the transceiver to transmit, to the BS over a shared frequency band, the UL communication without performing the CCA.

According to another aspect of the present disclosure, a base station (BS) includes: a transceiver; and a processor in communication with the transceiver and configured to cause the transceiver to: transmit, to a user equipment (UE), an indication of a first clear channel assessment (CCA) timing configuration; transmit, to the UE, first downlink control information (DCI) scheduling an uplink (UL) communication; transmit, to the UE, a request to perform a CCA associated with a second CCA timing configuration; and receive, from the UE, the UL communication in a time resource, wherein the time resource is associated with the first CCA timing configuration.

According to another aspect of the present disclosure, a non-transitory, computer-readable medium has program code recorded thereon, the program code comprising: code for causing a user equipment (UE) to receive, from a base station (BS), first downlink control information (DCI) scheduling an uplink (UL) communication; code for causing the UE to receive, from the BS, a request to perform a clear channel assessment (CCA) associated with a first CCA timing configuration, code for causing the UE to perform, based on an indication to change to a second CCA timing configuration different from the first CCA timing configuration, the CCA based on the second CCA timing configuration; and code for causing the UE to transmit, to the BS based on the CCA, the UL communication.

According to another aspect of the present disclosure, a non-transitory, computer-readable medium has program code recorded thereon, the program code comprising: code for causing a user equipment (UE) to receive, from a base station (BS), first downlink control information (DCI) scheduling an uplink (UL) communication; code for causing the UE to refrain, based on an absence of a channel access parameter in the first DCI, from performing a clear channel assessment (CCA); and code for causing the UE to transmit, to the BS over a shared frequency band, the UL communication without performing the CCA.

According to another aspect of the present disclosure, a non-transitory, computer-readable medium has program code recorded thereon, the program code comprising: code for causing a base station (BS) to transmit, to a user equipment (UE), an indication of a first clear channel assessment (CCA) timing configuration; code for causing the BS to transmit, to the UE, first downlink control information (DCI) scheduling an uplink (UL) communication; code for causing the BS to transmit, to the UE, a request to perform a CCA associated with a second CCA timing configuration; and code for causing the BS to receive, from the UE, the UL communication in a time resource, wherein the time resource is associated with the first CCA timing configuration.

According to another aspect of the present disclosure, a user equipment (UE) includes: means for receiving, from a base station (BS), first downlink control information (DCI) scheduling an uplink (UL) communication; means for receiving, from the BS, a request to perform a clear channel assessment (CCA) associated with a first CCA timing configuration; means for performing, based on an indication to change to a second CCA timing configuration different from the first CCA timing configuration, the CCA based on the second CCA timing configuration; and means for transmitting, to the BS based on the CCA, the UL communication.

According to another aspect of the present disclosure, a user equipment (UE) includes: means for receiving, from a base station (BS), first downlink control information (DCI) scheduling an uplink (UL) communication; means for refraining, based on an absence of a channel access parameter in the first DCI, from performing a clear channel assessment (CCA); and means for transmitting, to the BS over a shared frequency band, the UL communication without performing the CCA.

According to another aspect of the present disclosure, a base station (BS) includes: means for transmitting, to a user equipment (UE), an indication of a first clear channel assessment (CCA) timing configuration; means for transmitting, to the UE, first downlink control information (DCI) scheduling an uplink (UL) communication; means for transmitting, to the UE, a request to perform a CCA associated with a second CCA timing configuration; and means for receiving, from the UE, the UL communication in a time resource, wherein the time resource is associated with the first CCA timing configuration.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
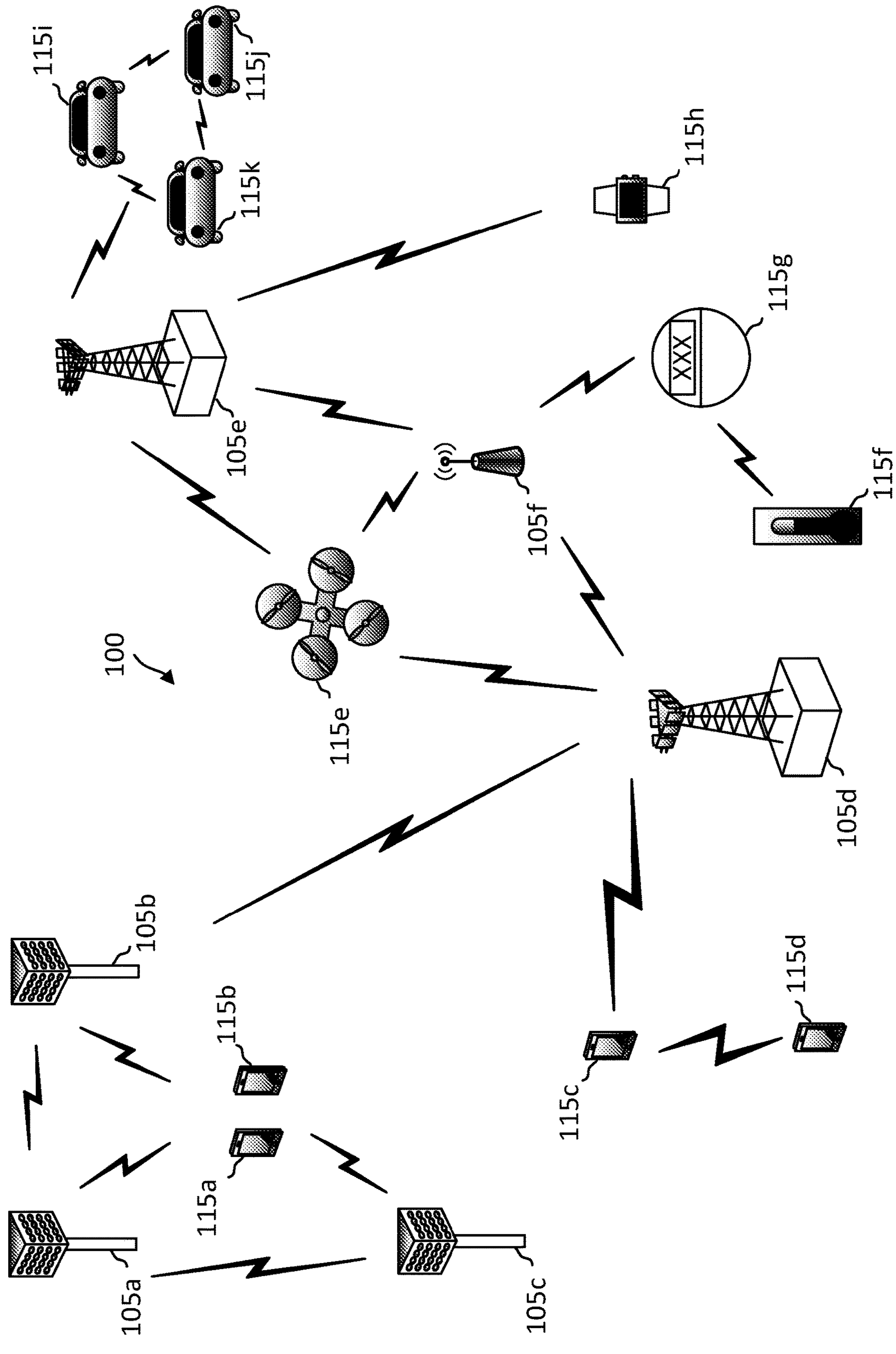
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5_{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~IM nodes/$km^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHZ, and the like bandwidth (BW). For other various outdoor and small cell coverage deployments of TDD greater than 3 GHZ, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 frequency bands at 7 GHz or lower (e.g., between about 410 MHz to about 7125 MHz). FR2 bands includes frequency bands in mmWave ranges between about 24.25 GHz and about 52.6 GHz. The mmWave bands have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Channel access in an unlicensed band may be controlled by regulations. For instance, some regulations may mandate a certain channel access scheme, such as listen-before-talk (LBT), for sharing an unlicensed band. In particular, a transmitting node (e.g., a base station (BS) or a user equipment (UE)) may employ an LBT procedure to contend for a transmission opportunity (TXOP) in a shared channel of the unlicensed band. When the LBT results in an LBT pass or success (the transmitting node wins contention for the wireless medium), the wireless communication device may access the shared channel to transmit data. When the LBT fails, the transmitting node may refrain from transmitting in the shared channel. In an example, the LBT may be based on energy detection. For instance, the LBT results in a pass or success when signal energy measured from the channel is below an energy detection (ED) threshold. Conversely, the LBT results in a failure when signal energy measured from the channel exceeds the ED threshold. In another example, the LBT may be based on signal detection. For example, the LBT results in a pass or success when a channel reservation signal (e.g., a predetermined preamble signal) is not detected in the channel. Conversely, the LBT results in a failure when a channel reservation signal is detected in the channel. A TXOP may also be referred to as channel occupancy time (COT). An LBT may also be referred to as a clear channel assessment (CCA).

As used herein, the terms "LBT pass," "LBT success," "CCA pass," and/or "CCA success" may refer to a clearance for transmission in a shared channel and/or a wireless communication device winning a contention in the shared channel, where the clearance may be based on a received signal measurement of the channel being below an ED threshold and/or the lack of a channel reservation signal present in the shared channel. Conversely, the terms "LBT failure," and/or "CCA failure" may refer to a failure in obtaining a clearance for transmission in a shared channel (e.g., the channel is busy or occupied) and/or a wireless communication device failing to win a contention in the shared channel, where the detection of the LBT or CCA failure is based on a received signal measurement of the channel being above an ED threshold and/or the presence of a channel reservation signal present in the channel.

An LBT may be in a variety of modes. An LBT mode may be, for example, a category 4 (CAT4) LBT, a category 2 (CAT2) LBT, or a category 1 (CAT1) LBT. A CAT1 LBT may refer to a no LBT mode, where no LBT is to be performed prior to a transmission. A CAT2 LBT may refer to an LBT without a random backoff period. For instance, a transmitting node may determine a channel measurement in a time interval and determine whether the channel is available or not based on a comparison of the channel measurement against a ED threshold. A CAT4 LBT may refer to an LBT with a random backoff and/or a variable contention window (CW). For instance, a transmitting node may draw a random number R and backoff for R number of contention slots or CCA slots. The node may transmit in the channel after the random backoff if the channel remains clear (idle) during each of the contention slots or CCA slots. The random backoff may also be referred to as countdown.

Further, LBT can be used for asynchronous channel access or synchronous channel access. In an asynchronous channel access system, such as a IEEE 802.11 (WiFi) system, a wireless communication device may access the channel at any time. In other words, a wireless communication device may perform an LBT to contend for a TXOP or COT at any time and may start a transmission upon wining the contention, for example, as soon as completing a successful LBT. On the other hand, in a synchronous channel access system, such as NR-unlicensed (NR-U), a wireless communication device (e.g., a BS or a UE) may access the channel at fixed time instants (e.g., periodic time instants). In particular, transmissions in NR-U are to start at a slot boundary. Thus, while an NR-U device (e.g., a BS or a UE) may perform an LBT and win the contention, the NR-U device may or may not start a transmission immediately upon winning the contention depending on the LBT completion time. For example, when the LBT completes at a point of time within a slot, the NR-U device may not be able to start a transmission immediately. Instead, the NR-U device may wait until a next slot boundary to start the transmission. Accordingly, there can be a transmission gap (a silence period) between the completion of the LBT and the start of the transmission.

In some aspects, a network may specify an LBT over a duration based on a randomly-generated counter. The randomly-generated counter may be referred to as a random backoff period. Accordingly, a BS requesting the LBT and/or scheduling DL or UL communications may only be aware of a maximum duration of the LBT and not a shorter random backoff period utilized by a UE for an LBT. Accordingly, the BS may schedule DL and/or UL communications based on the maximum allowed LBT duration. When the BS schedules a DL and/or UL communication that involves the UE performing a LBT, the BS may schedule the communication with a relatively large time gap between the start of the LBT and the communication to allow for the maximum allowed LBT duration. However, the relatively large time gap may increase the chance that another wireless communication device contends for the time resources in the shared frequency band, potentially interfering with communications between the BS and the UE. On the other hand, if the BS attempts to schedule a DL and/or UL communication within the maximum allowed duration of the LBT, then the UE may not finish performing the LBT before the scheduled communication. Therefore, the UE may fail to transmit or receive the communication in the scheduled time window.

The present disclosure describes mechanisms for indicating a timing configuration for a clear channel assessment (CCA), such as an LBT. For example, the mechanisms may include indicating a UE to perform a CCA associated with a first timing configuration. In some instances the first timing configuration may be associated with or based on a random counter and backoff period. In some aspects, the first timing configuration may be a default timing configuration associated with the CCA configuration. The mechanisms further include indicating the UE with a second timing configuration. For example, the UE may be indicated explicitly or implicitly by the BS to perform the CCA using the second timing configuration instead of the first timing configuration associated with the indicated CCA. The UE may perform the CCA using the second timing configuration. The second timing configuration may be based on a non-random counter or fixed value. In some aspects, the second timing configuration may result in a shorter CCA duration known to both the UE and the BS. Accordingly, the second timing configuration may be referred to as an upgraded timing configuration, or a shortened timing configuration. If the CCA is successful, the UE may then communicate a scheduled UL communication in a time resource. The time resource may be indicated by the BS in DCI. In some aspects, the scheduled time resource of the UL communication may be associated with the second timing configuration. In this regard, using the mechanisms described herein, the BS may schedule UL communications with a shorter time gap between the scheduling DCI and the UL communication. Further, the BS may be aware of the non-random upgraded timing configuration used by the UE to perform the CCA and may schedule the UL communication accordingly. Thus, the mechanisms described herein may reduce overhead in the shared frequency communications, and prevent the chance that other wireless communication devices contend for the time resources and interfere with the BS-UE communications. Accordingly, aspects of the present disclosure can improve network efficiency and reduce power consumption of the UE and/or BS.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (COMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K)

orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel as discussed above. In some aspects, a serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS 105 for UL transmission by performing a CAT4 LBT. In some instances, the UE 115 may also share the UE 115's COT with the BS 105. In some instances, the CAT4 LBT mode may be referred to as a type 1 LBT, and the CAT2 LBT mode may be referred to as a type 2 LBT.

Figure 2:
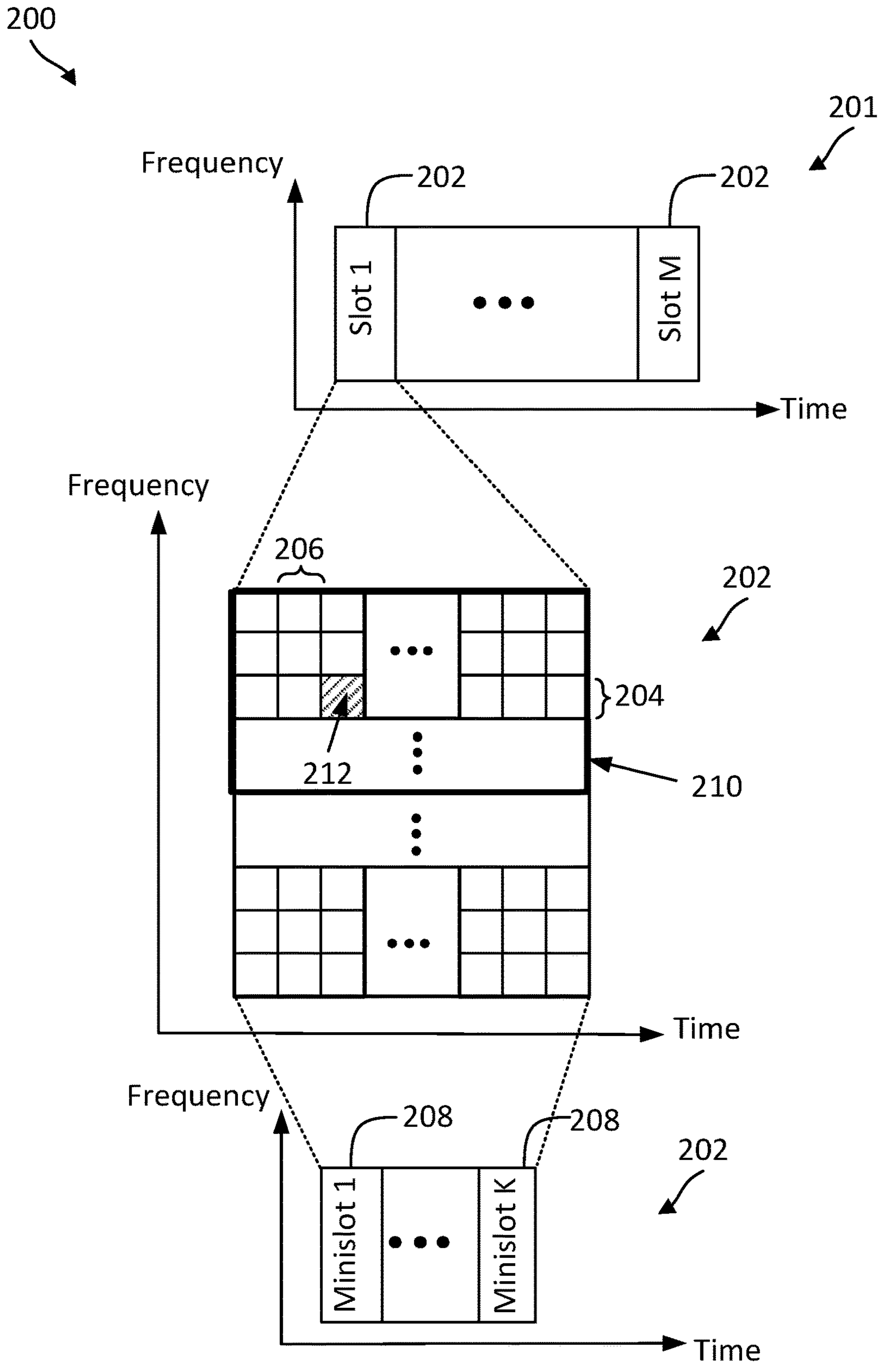
FIG. 2 is a timing diagram illustrating a radio frame structure according to some aspects of the present disclosure

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , 14 symbols).

In some aspects, the network 100 may be an NR-U network and the BSs 105 and the UEs 115 may operate in a synchronous channel access mode and may utilize the radio frame structure 200 for transmissions and/or receptions. In particular, a BS 105 or a UE 115 may start a transmission at a slot boundary (e.g., the start of a slot 202), and the BS 105 or the UE 115 may monitor for a reception at the slot boundary. When the network 100 operates over a shared channel, a BS 105 or a UE 115 may perform an LBT or procedure to contend for a TXOP or COT in the channel. As explained above, for a device with synchronous channel access, the device may have to wait for a gap duration before starting a transmission upon completing a successful LBT (with a contention win), for example, when the LBT completes before a next available transmission starting point (a next slot boundary).

Figure 3:
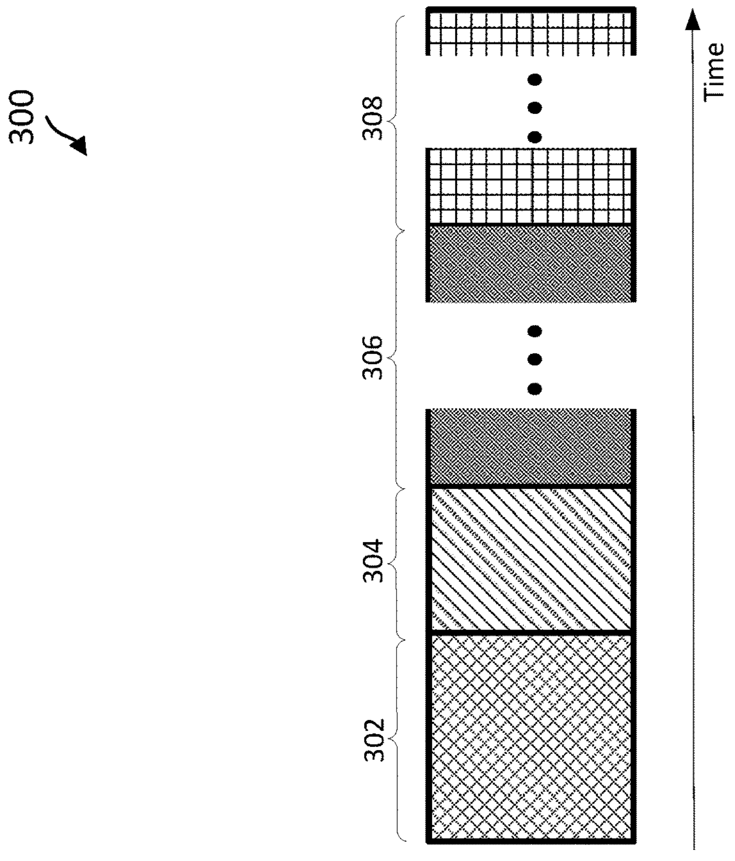
FIG. 3 is a timing diagram illustrating a listen-before-talk (LBT) procedure with a random backoff according to some aspects of the present disclosure.
Figure 4:
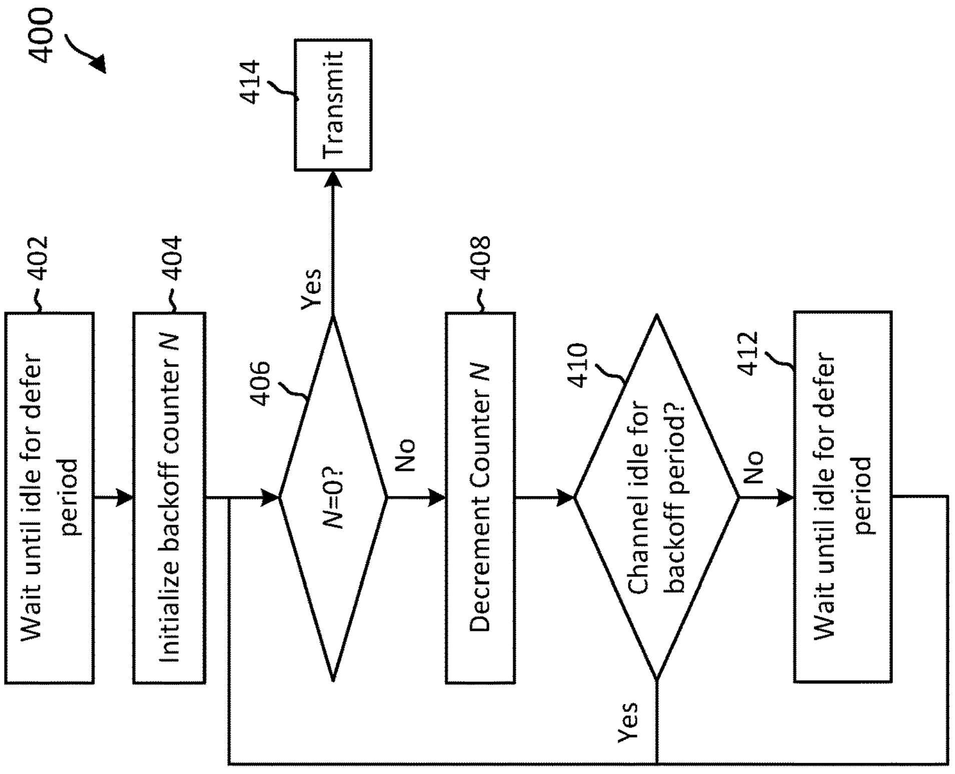
FIG. 4 is a flow diagram illustrating the LBT procedure shown in FIG. 3 according to some aspects of the present disclosure.

FIGS. 3 and 4 illustrate a channel access scheme with a counter-based backoff period according to some aspects of the present disclosure. In this regard, FIG. 4 illustrates the steps of the channel access scheme 400, and FIG. 3 illustrates the timing structure 300 of the channel access scheme 400. The scheme 400 may be employed by a wireless communication device such as a UE 115 in a network such as the networks 100 for communications. For example, the wireless communication device may perform a LBT by obtaining signal energy measurements over a LBT duration, where the LBT duration is based on an initial defer period and a counter-based backoff period or countdown. In FIG. 3, the x-axis represents time in some arbitrary units.

Referring to FIGS. 3 and 4, in the scheme 400, a wireless communication device (e.g., a UE 115) may perform a CAT4 LBT in a shared channel (e.g., a FR1 band, a FR2 band, FR2X band, or any suitable radio frequency band) to contend for a COT for a transmission, assist a BS with channel access, and/or for any other suitable purpose. The wireless communication device may perform sensing (e.g., an LBT or CCA) in the channel after a gap period 302. The gap period 302 may be based on a network configuration. Following the gap period 302, the wireless communication device senses a channel for an initial defer period 304 at action 402. For instance, action 402 may include the wireless communication device measuring signal energy in the channel during the defer period 304. When the wireless communication device detected a measured signal energy above an ED threshold, the channel is busy. In some instances, the ED threshold may be regulated by regulations. In some other instances, the ED threshold may be configured to achieve a certain channel sensing range. The wireless communication device may continue with channel sensing or CCA during the defer period 304. In some aspects, the defer period 304 may have a fixed duration, for example, about 16 microseconds (μs) long. In another aspect, the defer period 304 may include an initial fixed defer period (e.g., 16 μs), and one or more priority-based defer periods. For example, the duration of the defer period 304 may be defined as $T_d$=16 μs+m*9 μs, where m is based on a priority class (e.g., channel access priority class (CAPC)) associated with the channel access scheme 400. For example, m may be an integer value between 1 and 4 indicated by a BS for the LBT procedure. The value of m may be indicated in DCI via a channel access entry indicating an entry index corresponding to a preconfigured channel access table.

At action 404, the wireless communication device initializes a backoff counter N. The backoff counter N may be a randomly generated integer, which is selected or generated by the wireless communication device. The value of N may range between 0 and a maximum value, where the maximum value is associated with an indicated contention window (CW).

At action 406, the wireless communication device determines whether the value of N=0. If N=0, the wireless communication device proceeds to transmit a UL communication at action 414. In some aspects, if N=0, action 414 may include acquiring a channel occupancy time (COT), which is illustrated in FIG. 3 as the COT 308. If N≠0, the wireless communication device decrements the counter value N by one at action 408, and again senses the channel for a backoff period at action 410. In one example, the backoff period may be 9 μs. However, the backoff period may be any suitable value, including 4 μs, 5 μs, 8 μs, or any other suitable value, both greater or smaller. In some aspects, action 410 includes comparing signal energy measurements (e.g., reference signal received power (RSRP)) to an energy detection (ED) threshold. Accordingly, the channel may be considered idle if the signal energy measurements satisfy the ED threshold for the backoff period.

If the wireless communication device determines that the channel is idle during the backoff period at action 410, the wireless communication device returns to action 406 to determine whether the decremented counter value N=0. The wireless communication device may repeat the loop including actions 406, 408, and 410 until the counter value N=0. The loop of actions 406, 408, and 410, which is based on the randomly-generated value N, is shown in FIG. 3 as a random backoff duration 306. If the wireless communication device determines that the channel is not idle during the backoff period, the wireless communication device may again perform channel sensing during a defer period, which may be the same defer period described with respect to action 402.

Because the scheme 400 is based on a random counter value N generated by the wireless communication device, the network may not be aware of the total duration of the channel access procedure. In this regard, other network devices communicating with the wireless communication device (e.g., a BS), may accommodate for the channel access procedure by including relatively large time gaps between communications. For example, a BS may indicate a UE to perform a CAT4 LBT before transmitting a UL communication in a scheduled time resource. Because the BS does not know the duration of CAT4 LBT performed by the UE, the BS may schedule a UL communication after a large time gap to avoid the possibility of scheduling the UL communication while the UE is still performing the CAT4 LBT. However, and some aspects, it may be advantageous to reduce the duration of the channel access procedure performed by the wireless communication device to reduce the time gap between scheduled communications. In this regard, the present disclosure describes schemes and mechanisms for upgrading or shortening a channel access procedure based on one or more operating conditions. In particular, aspects of the present disclosure may be used in shared frequency bands, such as FR2X. In one aspect, a UE may receive a request to perform a CCA (e.g., CAT4 LBT) the CCA may be associated with a first time configuration, which may be a random counter-based time configuration as illustrated in FIGS. 3 and 4. The UE may then perform the CCA based on a second time configuration based on an explicit or implicit indication to perform an upgraded or shortened CCA.

Figure 5:
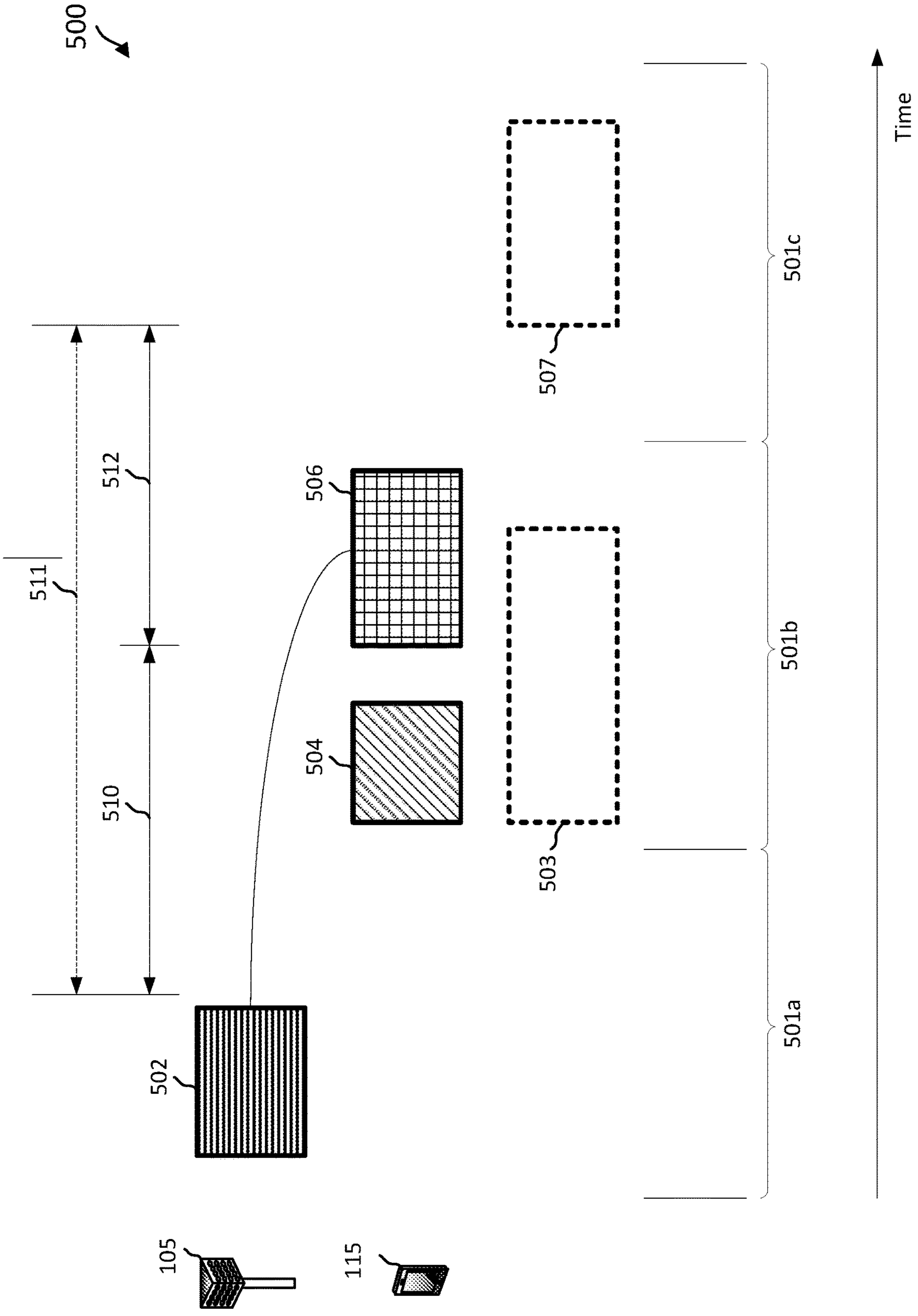
FIG. 5 is a timing diagram illustrating a method for upgrading a CCA timing configuration according to some aspects of the present disclosure.

FIG. 5 illustrates a scheme 500 for performing a CCA, according to some aspects of the present disclosure. The scheme 500 is performed by a UE 115 and a BS 105, which may be a UE 115 and a BS 105 of the network 100. In the scheme 500, the BS 105 transmits a DCI 502 indicating the UE 115 to perform a LBT procedure associated with a first timing configuration. The DCI 502 also schedules a UL communication 506 during a time resource. In this regard, the DCI 502 can indicate a time domain resource allocation (e.g., TDRA). The time domain resource allocation may be associated with a gap period 510 between the end of the DCI 502 and the beginning of the scheduled UL communication 506.

The DCI 502 may be transmitted in a first slot 501*a*, and the scheduled UL communication 506 may be scheduled in a second slot 501*b* immediately following the first slot 501*a*.

The UE 115 performs, in response to receiving the DCI 502, the LBT 504 in the second slot 501*b*. The LBT 504 indicated in the DCI 502 may be associated with a first time configuration. For example, the DCI 502 may indicate an entry index of a channel access table or configuration, where the entry index indicates a type of the LBT and/or the associated time configuration of the LBT. In one example, the first time configuration may be a random backoff-based time configuration as illustrated in FIG. 4, for example. In this regard, block 503 illustrates a maximum potential length of the LBT 504 if performed according to the first time configuration, which may involve a random backoff counter (e.g., CAT4 LBT). Block 504 illustrates the LBT performed based on an upgraded time configuration, which may be indicated explicitly or implicitly. In the illustrated example, the second CCA timing configuration may be indicated dynamically with the DCI 502. In other aspects, the BS 105 may transmit a semi-static configuration (e.g., RRC configuration) indicating a second CCA timing configuration for performing the LBT 504. In some aspects, the semi-static configuration may include a non-random counter value of N. In that regard, based on the indication, the UE 115 may perform the LBT 504 using the pre-configured or indicated value of N instead of a randomly-generated value. For example, the BS 105 may indicate a counter value of 0, 1, 2, etc., such that the duration of the LBT 504 is fixed and known to the BS 105. The length of the LBT 504 performed based on the second timing configuration may be shorter than the duration of the LBT 503 that would have been performed based on the first timing configuration, which may be a default time configuration associated with the LBT requested by the DCI 502. For example, the second CCA timing configuration may indicate a formula for the CCA duration based on a pre-configured and/or indicated counter value N. For example, the second CCA timing configuration may be determined based on the relationship 8 μs+N*5 μs. In one example, the second CCA timing configuration may indicate a counter value of 0 and an initial defer period of 8 μs. Thus, the duration of the CCA based on the second CCA timing configuration may be 8 μs. By comparison, the first CCA timing configuration may indicate an initial defer period of 16 μs+m*9 μs, followed by a random backoff period of N*9 μs. The value m may range from 1 to 4, and may be based on a priority class of the BS-UE communications. N may be a randomly-generated counter in the first CCA timing configuration. Thus, even if the UE randomly generates N as 0, the shortest duration allowed by the first CCA timing configuration may be 25 μs. However, in some aspects, the second CCA timing configuration may result in CCA durations that are equal to or longer than at least some of the CCA durations determined using the first CCA timing configuration. For example, the second CCA timing configuration may indicate the counter value N=4, such that the CCA duration may be 8 μs+4*5 μs=28 μs, which is longer than the minimum allowed CCA duration allowed by the first CCA timing configuration.

In another aspect, the UE 115 may be semi-statically configured with the second timing configuration using RRC signaling and/or MAC-CE activation. In another aspect, the UE 115 may be statically configured with the second timing configuration (e.g., hard coded based on network specification). In some instances, the UE 115 may be configured to use the statically-configured second time configuration based on one or more operating conditions. For example, the UE 115 may be configured to use the statically-configured second time configuration based on the frequency band of the scheduled UL communication, the type of LBT, the indicated channel access configuration for the LBT (e.g., entry index of the channel access table), and/or the type of the scheduled UL communication (e.g., short control signaling, user plane transmission, etc.). In another aspect, the UE 115 may be implicitly indicated to use the second timing configuration. For example, the UE 115 may be implicitly indicated to use the second timing configuration if a DCI (e.g., DCI 2_0) indicates that the scheduled UL communication 506 is scheduled in a BS COT. In another aspect, the UE 115 may be implicitly indicated to use the second timing configuration if a time gap between the scheduled UL communication 506 and the last DL communication (e.g., DCI 502) satisfies a threshold. For example, the UE 115 may be implicitly indicated to use the second timing configuration if a time gap between the scheduled UL communication 506 and the last DL communication is below the threshold. In another example, the UE 115 may be implicitly indicated to use the second timing configuration if a time gap between the scheduled UL communication 506 and the last DL communication is equal to or below the threshold.

As shown in FIG. 5, the scheme 500 may allow for more temporally efficient communication between the BS 105 and the UE 115. In this regard, if the BS 105 can configure the UE 115 to perform an upgraded or shortened LBT 504 based on the second CCA timing configuration. The BS 105 may schedule the UL communication 506 with a shorter time gap 510 compared to the time gap 511 associated with using the first CCA timing configuration. For example, as shown, the LBT 503 based on the first CCA timing configuration may result in the time gap 511 before the UL communication 507 can be transmitted. For example, the BS 105 may not schedule the hypothetical UL communication 507 until the third slot 501*c* if the first timing configuration were used to perform the LBT 503. On the other hand, if the UE 115 performs the LBT 504 based on the second CCA timing configuration, the UL communication 506 may be transmitted earlier, resulting in a time savings 512. Further, with the shorter time gap 510, the chance of intervening communications and/or collisions between the DCI 502 and the UL communication 506 is reduced.

Figure 6:
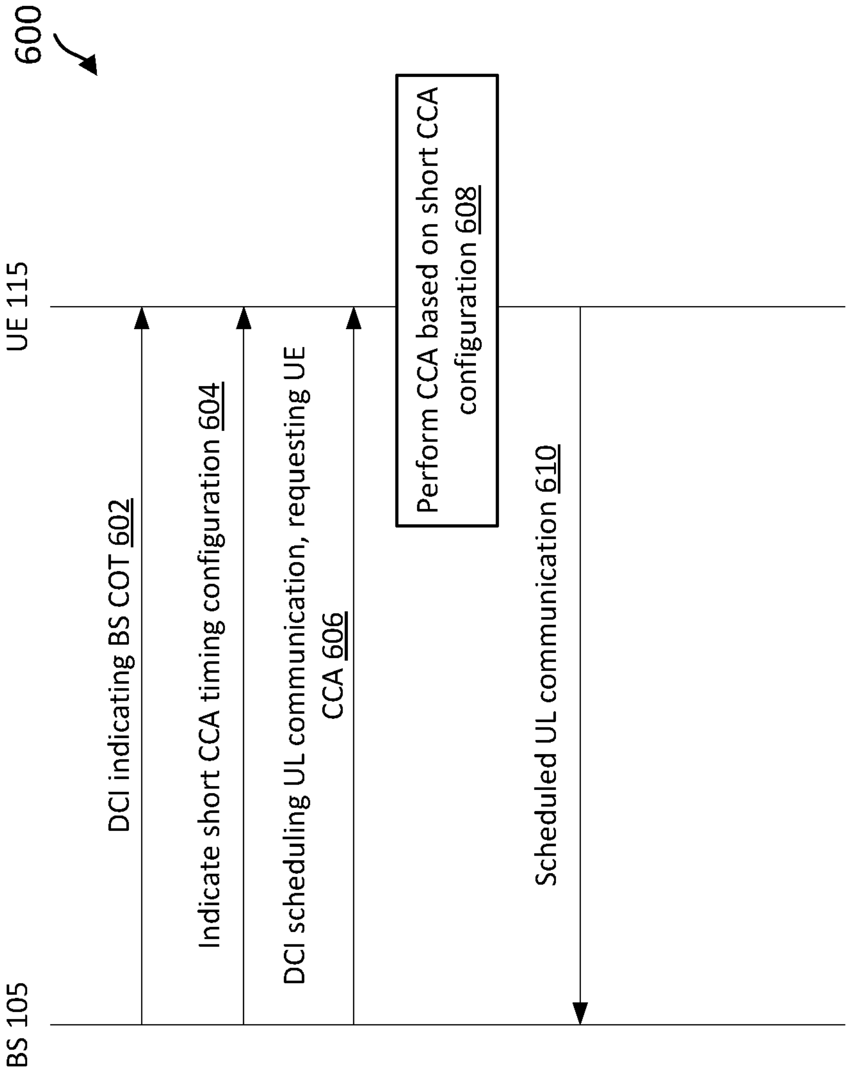
FIG. 6 is a signaling diagram illustrating a method for upgrading a CCA timing configuration according to some aspects of the present disclosure.

FIG. 6 is a signaling diagram of a method 600 for indicating an upgraded CCA timing configuration, according to aspects of the present disclosure. The method 600 is performed by a BS 105 and a UE 115, which may be one of the BSs 105 and one of the UEs 115 in the network 100. The method 600 may include aspects of the schemes 400 and/or 500 described above. In this regard, the method 600 may include indicating the UE 115 to use a short or upgraded CCA timing configuration instead of a default CCA timing configuration associated with a request to perform the CCA.

At action 602, the BS 105 transmits, and the UE 115 receives, a DCI indicating that a BS COT has been acquired or initiated by the BS 105. In some aspects, action 602 includes the UE 115 receiving a DCI 2_0 indicating a time resource associated with the BS COT.

At action 604, the BS 105 transmits, and the UE 115 receives, a short CCA timing configuration. In one aspect, action 604 may include transmitting an indication of a non-random CCA timing configuration. For example, the short CCA timing configuration may define a CCA duration as 8 μs+N*5 μs, where Nis an integer value that is assignable and/or indicated by the BS 105. In this regard, in some aspects, action 604 may include indicating the value of N. The BS 105 may indicate, to the UE 115, the value of N using RRC signaling, MAC-CE, and/or DCI. For example, the BS 105 may semi-statically indicate the value of N via RRC signaling, and may activate the value of N by transmitting a MAC-CE in a PDSCH. In another aspect, the BS 105 may dynamically indicate the value of N via DCI. For example, in some aspects, the BS 105 may transmit an indication of an entry or row of a channel access table, where the entry or row indicates the value N. To indicate a shorter CCA, the BS 105 may transmit an indication setting the value of N to 0 or 1, for example. However, the BS 105 may indicate the UE 115 with any suitable value of N, including 0, 1, 2, 3, 5, 7, or any other suitable value, both greater or smaller. In another aspect, the CCA request may indicate a fixed CCA duration that is not based on N. For example, the CCA request may indicate a fixed CCA duration of 8 μs. In another aspect, the CCA request may indicate a CCA duration of 0 μs. That is, the short CCA timing configuration may indicate the UE 115 to refrain from performing the CCA.

In other aspects, the UE 115 may be pre-configured with the short CCA timing configuration. For example, the UE 115 may be pre-configured with a value for N, and may also be configured with one or more rules for using the short CCA timing configuration instead of the default timing configuration for the CCA depending on one or more operating conditions, such as the frequency band of the communications. For example, the UE 115 may be configured to use the pre-configured (e.g., hard coded) short CCA timing configuration if the BS-UE communications are performed in the FR2X range of frequencies.

At action 606, the BS 105 transmits, and the UE 115 receives, a DCI scheduling a UL communication, and requesting the UE 115 to perform a CCA In some aspects, action 606 includes the BS transmitting a DCI having a format 0_0 or 0_1. The DCI may indicate a time resource associated with the scheduled UL communication. For example, the DCI may indicate an entry, row, or index of a time domain resource allocation (TDRA) table. In some aspects, the DCI is transmitted in the BS-acquired COT. In one aspect, the DCI may carry a dynamic indication of the short CCA timing configuration transmitted at action 604. In other words, in some aspects, the actions 604 and 606 may be performed by transmitting a single DCI.

The DCI may indicate a channel access indicator associated with the CCA. For example, the DCI may indicate an entry index of a channel access table carried in the DCI, where each row or entry of the channel access table indicates a type of CCA to be performed. Each row or entry of the table may also indicate a cyclic prefix extension index, and/or a channel access priority class (CAPC) associated with the indicated type of CCA. For example, action 606 may include receiving an indication of a ChannelAccess-CPext, ChannelAccess-CPext-CAPC, or any other suitable channel access parameter carried in DCI.

The CCA request may be associated with a default CCA duration and/or default CCA timing configuration, which may be referred to as a long CCA timing configuration. For example, the UE 115 may be configured with one or more CCA timing configurations including the long CCA timing configuration. In one aspect, each row or entry of a configured channel access table may be associated with a CCA timing configuration defining the duration of the CCA. In some aspects, the indication of the CCA request may indicate the UE 115 to perform a type of CCA associated with the long CCA timing configuration, where the long CCA timing configuration includes a defer period and a random backoff period. The random backoff period may be based on an integer multiple of a constant. For example, the first timing configuration may specify the defer period as 16 μs+m*9 μs, were m is associated with the priority class (e.g., CAPC) of the scheduled UL communication. The random backoff period may involve an additional period of N*9 μs, where N is an integer. In some aspects, N may be a random integer determined or selected by the UE 115.

At action 608, the UE 115 performs the CCA based on the short CCA timing configuration indicated at action 604, instead of the default CCA timing configuration associated with the CCA. Performing the CCA may include measuring signal energy (e.g., RSRP) in the shared frequency band during a CCA duration determined or indicated based on the short CCA timing configuration, and comparing the measured signal energy to a preconfigured energy detection (ED) threshold. In some aspects, the ED threshold may be statically configured by the network based on the network specification (e.g., 3GPP specification). In other aspects, the ED threshold may be semi-statically configured, and/or dynamically signaled. In some aspects, performing the CCA may be comparing two or more signal energy measurements to two or more thresholds. For example, performing the CCA may include comparing signal energy measurements from a first portion of the CCA duration to a first threshold, and comparing signal energy measurements from a second portion of the CCA duration to a second threshold different form the first threshold.

If the CCA results in a pass, at action 610, the UE 115 transmits, and the BS 105 receives, the scheduled UL communication. In this regard, transmitting the UL communication may include transmitting UL control information and/or UL data in a PUSCH. The time resources of UL communication may be indicated in the DCI received at action 606. In some aspects, the time resources of the UL communication may be based on the short CCA timing configuration indicated at action 606. For example, if the BS 105 indicates the UE to use the short CCA timing configuration to perform the CCA, the BS 105 may schedule the UL communication with a shorter gap, since a longer gap associated with a longer CCA duration (e.g., CAT4 LBT with random backoff) is not necessary. In this way, the chance of a collision or interference in the time gap between the indication of the BS COT and the scheduled UL communication is reduced. Further, the COT overhead may also be reduced.

Figure 7:
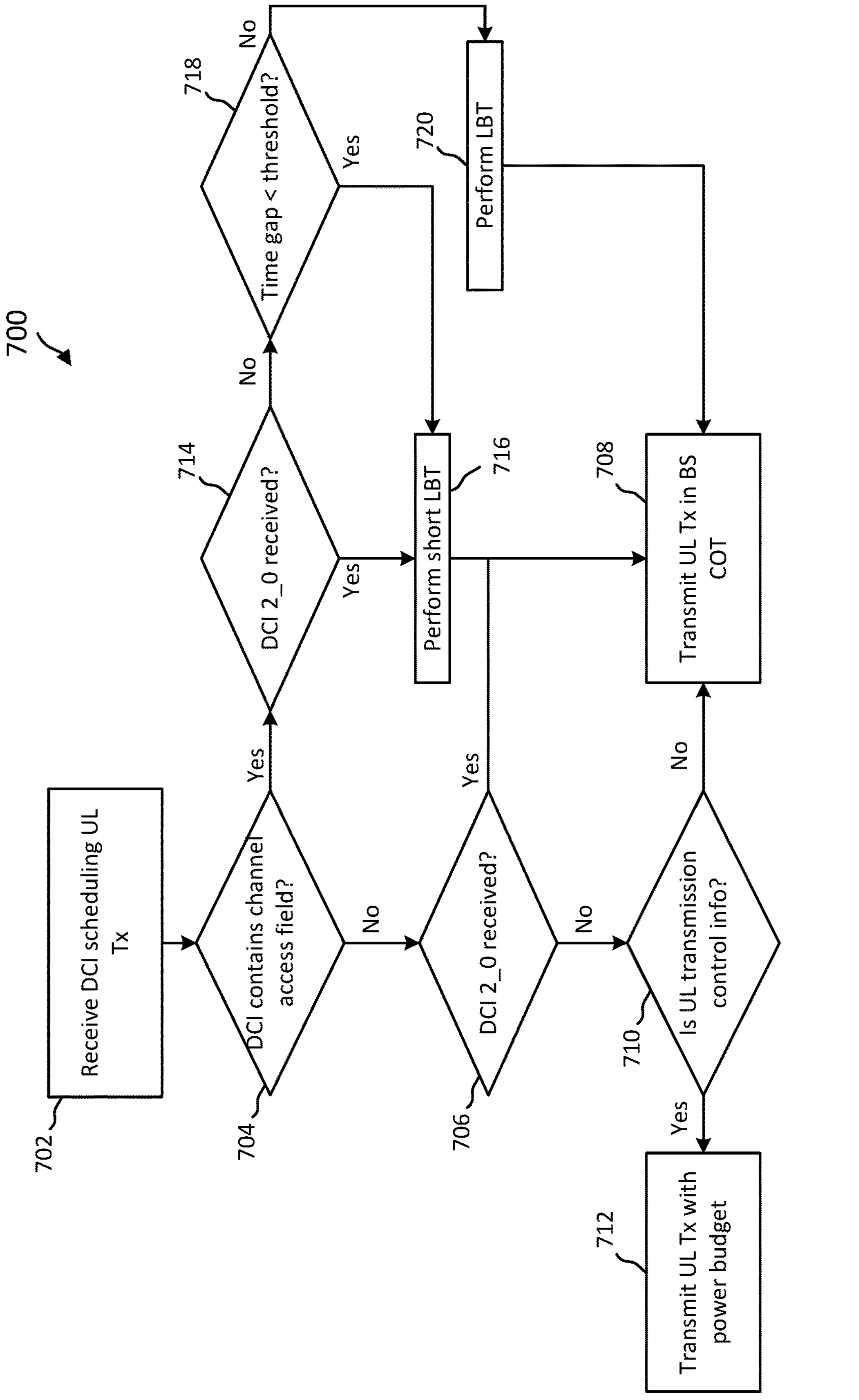
FIG. 7 is a flow diagram illustrating a method for implicitly indicating an upgraded CCA timing configuration according to some aspects of the present disclosure.

FIG. 7 illustrates a scheme 700 for implicit LBT indication, according to aspects of the present disclosure. In some aspects, the UE may be implicitly indicated to refrain from performing a requested LBT, or to upgrade the requested LBT by using a different time configuration, as explained above. The UE may be implicitly indicated based on one or more of a channel access field, a DCI indicating a COT time resource, a type of the UL communication (e.g., short control signaling, user plane transmission, PUSCH transmission, etc.), and/or a time gap between the scheduled UL communication.

At action 702, the BS transmits and the UE receives, a DCI scheduling a UL transmission. In some aspects, the DCI may also indicate a request to perform a CCA, such as a CAT4 LBT. For example, the DCI may indicate an entry or row of a channel access table. In other aspects, the UE may be implicitly indicated to perform the LBT based on the scheduled UL transmission indicated in the DCI. Some aspects, action 702 includes receiving a DCI 0_0 or DCI 0_1. The DCI may indicate a time resource (e.g., TDRA indication) of the scheduled UL transmission.

At action 704, the UE determines whether the DCI contains an entry for a channel access field. For example, the UE may decode the DCI and determine whether the channel access field is present. In some aspects, the UE may determine whether the channel access field in the DCI indicates a null value. If the UE determines that the channel access field is absent or empty, the UE determines whether a DCI 2_0 indicating that the scheduled UL communication is scheduled in a BS COT was previously received at action 706. If the DCI 2_0 was previously received, the UE may proceed to transmit the scheduled UL transmission based on the BS COT, and without performing an LBT at action 708. If the DCI 2_0 was not previously received, the UE may determine, at action 710, whether the UL transmission includes short control signaling, or if the UL transmission includes some other type of UL communication, such as UL data scheduled in a PUSCH. If the UL transmission is short control signaling, the UE may transmit the UL transmission based on a contention exempt power budget (e.g., 10%) in action 712. In this regard, the UE may transmit the UL transmission whether or not the UL transmission is associated with a BS COT. In this regard, it may not be known to the UE whether the DCI 2_0 was not received because it was not transmitted by the BS, or because the UE failed to detect and decode the DCI 2_0. If the UL transmission is not control information, the UE may transmit the UL transmission based on the BS COT in action 708. In this regard, the non-control signaling type of the UL transmission may implicitly indicate to the UE that the UL transmission is scheduled in a BS COT, so that the UE transmits the UL transmission without using the contention exempt power budget used at action 712.

The actions 706 and 710 may be used to forgo or refrain from performing the LBT prior to the UL transmission if the DCI does not contain the channel access field at action 704. The scheme 700 also includes mechanisms for implicitly indicating the UE to perform the LBT to use a second CCA timing configuration instead of the default first CCA timing configuration associated with the LBT if the DCI contains the channel access field at action 704. At action 714, in response to determining that the DCI contains the channel access field, the UE determines whether a DCI 2_0 was previously received, similar to action 706. If the DCI 2_0 was previously received and indicates that the UL transmission is associated with a BS COT, the UE may be implicitly indicated to perform the LBT based on the second CCA timing configuration at action 716. In some aspects, the second CCA timing configuration may be referred to as a short CCA timing configuration as explained above. For example, in response to receiving the DCI 2_0, the UE may be configured to use a statically configured, semi-statically configured, or dynamically indicated timing configuration to perform the shortened LBT. For example, the timing configuration may include or indicate a non-random counter value to be used in place of a randomly generated counter value to determine the duration of the LBT. In other aspects, the second CCA timing configuration may include a fixed value or duration. If the LBT results in a pass, the UE may transmit the UL transmission at action 708.

If the DCI 2_0 was not received, the UE determines whether a time gap between the last DL communication (e.g., scheduling DCI) and the scheduled UL transmission satisfies a threshold at action 718. In some aspects, the threshold may be based on a default CCA timing configuration associated with the LBT. For example, the default timing configuration may include a defer period and a random backoff period for a CAT4 LBT. The threshold may be based on a maximum and/or minimum allowed duration of the default random backoff LBT duration. In one example, the threshold may be 23 μs. However, any suitable threshold may be used, including 10 μs, 15 μs, 20 μs, 30 μs, or any other suitable threshold.

If the time gap satisfies the threshold, the UE may be implicitly indicated that the UL transmission is scheduled in the BS COT, and performs the short or upgraded LBT at action 716. If the time gap does not satisfy the threshold, the UE may perform the LBT based on the default timing configuration (e.g., random backoff) at action 720.

The various mechanisms for implicit indication in the scheme 700 include determining, based on one or more DL communications, whether the UE can refrain from performing an LBT, or whether the UE can use the second CCA timing configuration for performing the LBT. In some aspects, the one or more DL communications may include the DCI scheduling the UL transmission and/or requesting the LBT. For example, the implicit indication may be based on a presence or absence of a channel access field and/or a time gap between the DCI and the scheduled UL communication. In another aspect, the one or more DL communications may include a DCI 2_0 indicating COT information (e.g., BS COT time resource). Accordingly, the scheme 700 may allow the UE to determine whether to perform the LBT based on the second CCA timing configuration, or to refrain from performing the LBT, without receiving an explicit instruction or indication to do so.

Figure 8:
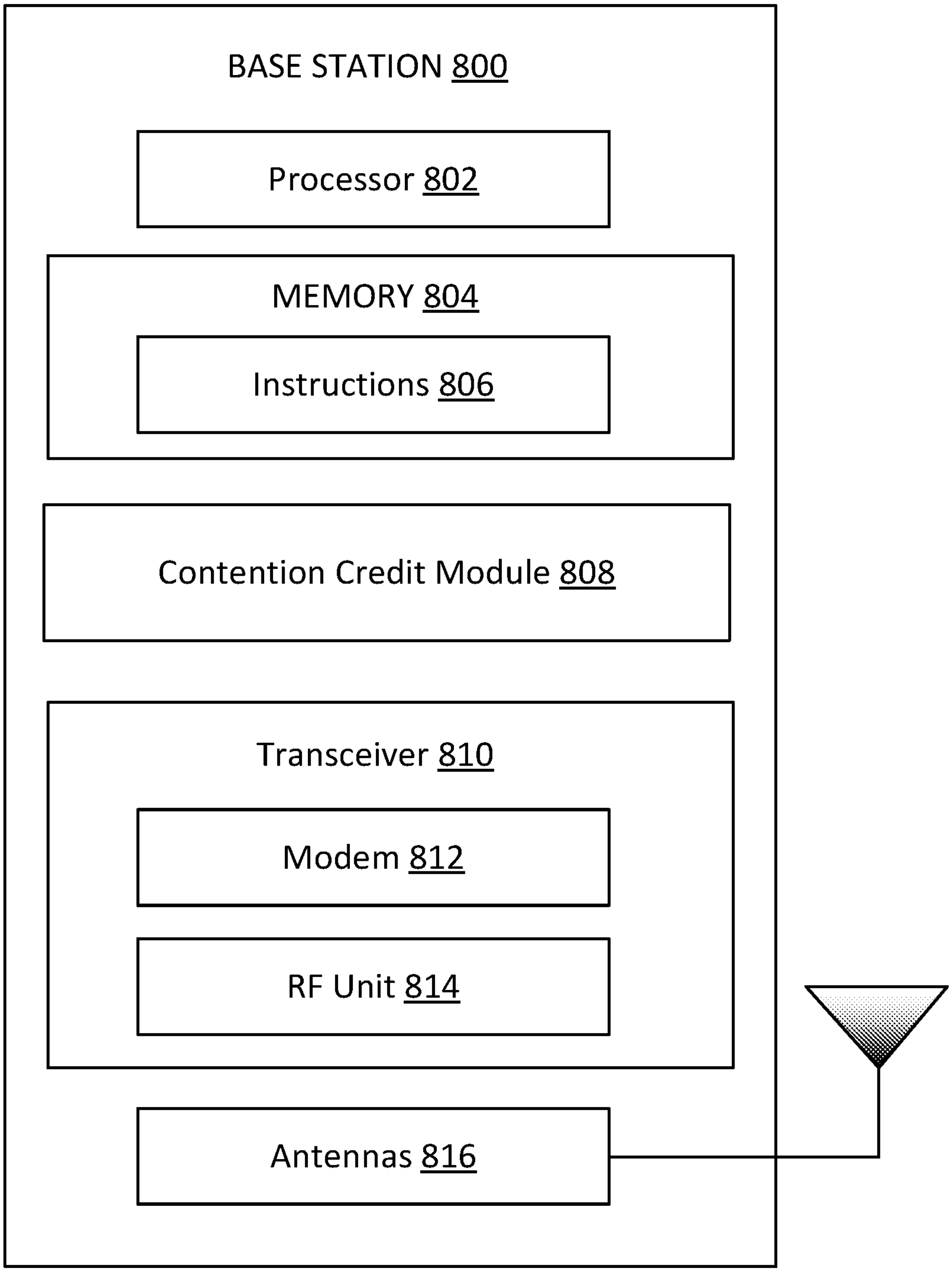
FIG. 8 illustrates a block diagram of a base station (BS) according to some aspects of the present disclosure.

FIG. 8 is a block diagram of an exemplary BS 800 according to some aspects of the present disclosure. The BS 800 may be a BS 105 as discussed in FIGS. 1-7. A shown, the BS 800 may include a processor 802, a memory 804, a CCA timing configuration module 808, a transceiver 810 including a modem subsystem 812 and a RF unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-12. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The CCA timing configuration module 808 may be implemented via hardware, software, or combinations thereof. For example, the CCA timing configuration module 808 may be implemented as a processor, circuit, and/or instructions 806 stored in the memory 804 and executed by the processor 802. In some examples, the CCA timing configuration module 808 can be integrated within the modem subsystem 812. For example, the CCA timing configuration module 808 can be implemented by a combination of software components (e.g., executed by a DSP or a general processor) and hardware components (e.g., logic gates and circuitry) within the modem subsystem 812. The CCA timing configuration module 808 may communicate with one or more components of BS 800 to implement various aspects of the present disclosure, for example, aspects of FIGS. 1-12.

For instance, the CCA timing configuration module 808 may be configured to transmit, to a UE, an indication of a first CCA timing configuration. For example, the CCA timing configuration module 808 may indicate the UE to perform a CCA of a first type (e.g., CAT4 LBT), where the first type of CCA is associated with a second CCA timing configuration (e.g., defer period with a random backoff). The CCA timing configuration module 808 may be configured to transmit an indication of a non-random CCA timing configuration. For example, the first CCA timing configuration may define a CCA duration as 8 μs+N*5 μs, where N is an integer value that is assignable and/or indicated by the BS. In this regard, in some aspects, CCA timing configuration module 808 may indicate the value of N. The CCA timing configuration module 808 may indicate, to the UE, the value of N using RRC signaling, MAC-CE, and/or DCI. For example, the CCA timing configuration module 808 may semi-statically indicate the value of N via RRC signaling, and may activate the value of N by transmitting a MAC-CE in a PDSCH. In another aspect, the CCA timing configuration module 808 may dynamically indicate the value of N via DCI. For example, in some aspects, the CCA timing configuration module 808 may transmit an indication of an entry or row of a channel access table, where the entry or row indicates the value N. To indicate a shorter CCA, the CCA timing configuration module 808 may transmit an indication setting the value of N to 0 or 1, for example. However, the CCA timing configuration module 808 may indicate the UE with any suitable value of N, including 0, 1, 2, 3, 5, 7, or any other suitable value, both greater or smaller. In another aspect, the CCA request may indicate a fixed CCA duration that is not based on N. For example, the CCA request may indicate a fixed CCA duration of 8 μs. In another aspect, the CCA request may indicate a CCA duration of 0 μs.

In another aspect, the CCA timing configuration module 808 is configured to transmit, to the UE, first downlink control information (DCI) scheduling an uplink (UL) communication. In some aspects, the CCA timing configuration module 808 may transmit a DCI having a format 0_0 or 0_1. The DCI may indicate a time resource associated with the scheduled UL communication. For example, the DCI may indicate an entry, row, or index of a time domain resource allocation (TDRA) table. In some aspects, the DCI is transmitted in a BS-acquired channel occupancy time (COT). In one aspect, the DCI may carry a dynamic indication of the first CCA timing configuration.

In another aspect, the CCA timing configuration module 808 is configured to transmit, to the UE, a DL signal indicating request to perform a clear channel assessment (CCA) associated with a second CCA timing configuration. For example, in some aspects, the CCA timing configuration module 808 is configured to transmit or indicate a request to perform a LBT procedure. Transmitting the DL signal may include transmitting an indication of a channel access configuration. In some aspects, the request may be carried in the scheduling DCI. In this regard, in some aspects, the CCA timing configuration module 808 is configured to transmit the DCI at block 1120, where the DCI indicates both the scheduled UL communication and the request to perform the CCA. Accordingly, in some aspects, the CCA timing configuration module 808 is configured to transmit a DCI indicating the first CCA timing configuration, a UL scheduling grant, and a request to perform a CCA associated with a second CCA timing configuration different from the first timing configuration. The request may include an indication of an entry index of a channel access table carried in the DCI, where each row or entry of the channel access table indicates a type of CCA to be performed. Each row or entry of the table may also indicate a cyclic prefix extension index, and/or a channel access priority class (CAPC) associated with the indicated type of CCA. For example, the CCA timing configuration module 808 is configured to transmit a ChannelAccess-CPext, ChannelAccess-CPext-CAPC, or any other suitable channel access parameter.

In another aspect, the CCA timing configuration module 808 may be configured to receive the UL communication from the UE in a time resource. The time resource of the scheduled UL communication may be based on the first CCA timing configuration. For example, the first CCA timing configuration may be associated with a shorter CCA duration than the second CCA timing configuration. Accordingly, the CCA timing configuration module 808 may schedule the UL communication with a shorter gap between the scheduling DCI and the scheduled UL communication, since a longer gap associated with a longer CCA duration (e.g., CAT4 LBT with random backoff) is not used As shown, the transceiver 810 may include the modem subsystem 812 and the RF unit 814. The transceiver 810 can be configured to communicate bi-directionally with other devices, such as the UEs 115 and/or BS 800 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., RRC configurations, PDSCH data, PDCCH DCI, etc.) from the modem subsystem 812 (on outbound transmissions) or of transmissions originating from another source such as a UE 115 and/or UE 1400. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The transceiver 810 may provide the demodulated and decoded data (e.g., PUSCH data, PUCCH UCI, etc.) to the CCA timing configuration module 808 for processing. The antennas 816 may include multiple antennas of similar or different designs in order to sustain multiple transmission links.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Further, in some aspects, the processor 802 is configured to communicate with various components of the BS 800 to indicate one or more aspects of a CCA timing configuration. The transceiver 810 is coupled to the processor 802 and configured to transmit an indication of a first CCA timing configuration, and a request to perform a CCA associated with a second CCA timing configuration.

Figure 9:
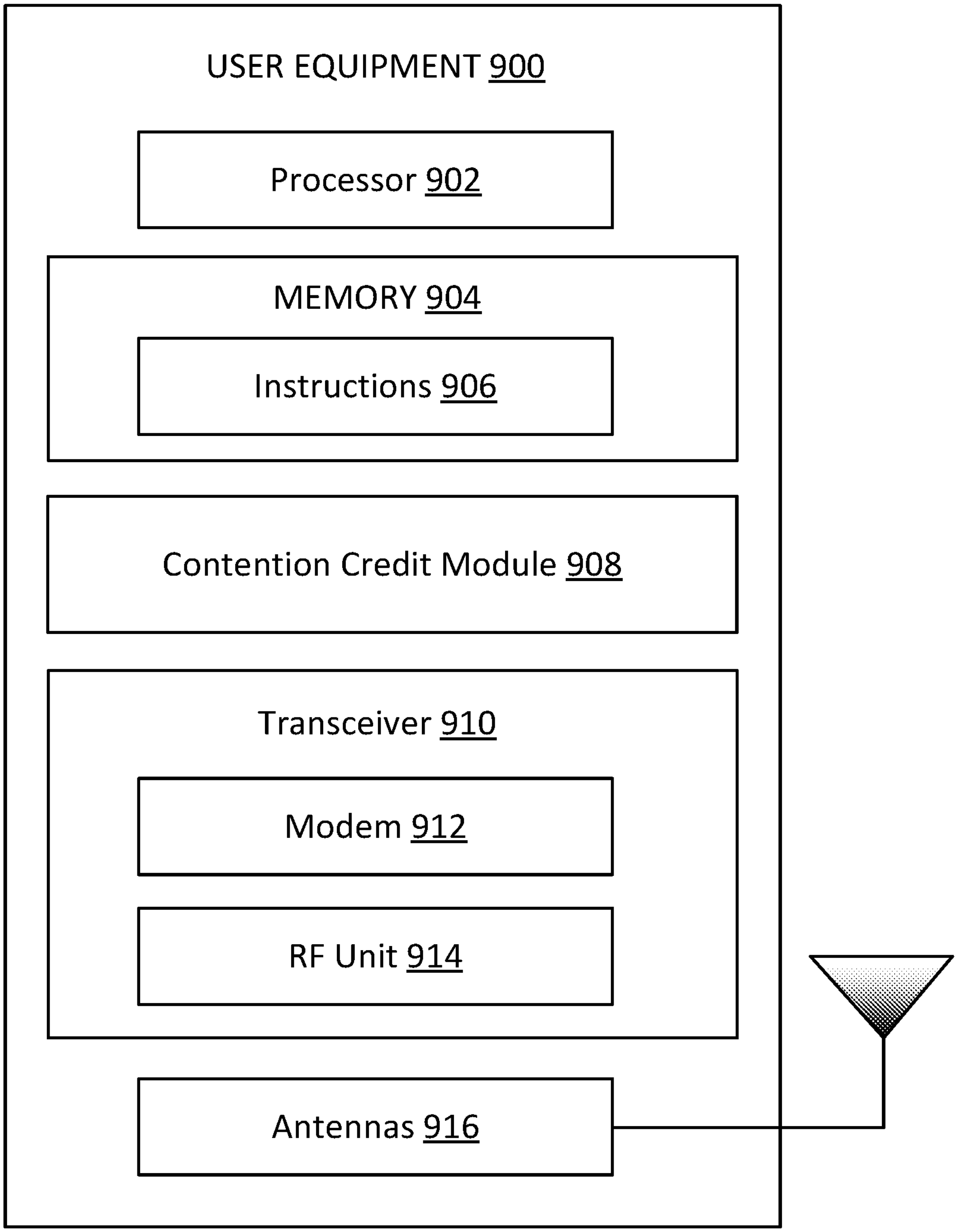
FIG. 9 illustrates a block diagram of a user equipment (UE) according to some aspects of the present disclosure.

FIG. 9 is a block diagram of an exemplary UE 900 according to some aspects of the present disclosure. The UE 900 may be a UE 115 as discussed above in FIGS. 1-7. As shown, the UE 900 may include a processor 902, a memory 904, a CCA timing configuration module 908, a transceiver 910 including a modem subsystem 912 and a radio frequency (RF) unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to a UE 115 or an anchor in connection with aspects of the present disclosure, for example, aspects of FIGS. 1-12. Instructions 906 may also be referred to as code, which may be interpreted broadly to include any type of computer-readable statement(s) as discussed above with respect to FIG. 13.

The CCA timing configuration module 908 may be implemented via hardware, software, or combinations thereof. For example, the CCA timing configuration module 908 may be implemented as a processor, circuit, and/or instructions 906 stored in the memory 904 and executed by the processor 902. In some aspects, the CCA timing configuration module 908 can be integrated within the modem subsystem 912. For example, the CCA timing configuration module 908 can be implemented by a combination of software components (e.g., executed by a DSP or a general processor) and hardware components (e.g., logic gates and circuitry) within the modem subsystem 912. The CCA timing configuration module 908 may communicate with one or more components of UE 900 to implement various aspects of the present disclosure, for example, aspects of FIGS. 1-12.

For instance, the CCA timing configuration module 908 is configured to receive, from a BS, first downlink control information (DCI) scheduling an uplink (UL) communication. In some aspects, the CCA timing configuration module 908 may receive a DCI having a format 0_0 or 0_1. The DCI may indicate a time resource associated with the scheduled UL communication. For example, the DCI may indicate an entry, row, or index of a time domain resource allocation (TDRA) table. In some aspects, the CCA timing configuration module 908 may receive the DCI in a BS-acquired channel occupancy time (COT).

In another aspect, the CCA timing configuration module 908 is configured to receive, from the BS, a request to perform a clear channel assessment (CCA) associated with a first CCA duration. The first CCA duration may be based on a first timing configuration. For example, in some aspects, the CCA timing configuration module 908 is configured to receive a request to perform a listen-before-talk (LBT) procedure. Receiving the request may include receiving an indication of a channel access configuration. In some aspects, the request may be carried in the DCI scheduling the UL communication. In this regard, in some aspects, the CCA timing configuration module 908 is configured to receive the DCI indicating the request to perform the CCA. The request may include an indication of an entry index of a channel access table carried in the DCI, where each row or entry of the channel access table indicates a type of CCA to be performed. Each row or entry of the table may also indicate a cyclic prefix extension index, and/or a channel access priority class (CAPC) associated with the indicated type of CCA. For example, the CCA timing configuration module 908 may be configured to receive a ChannelAccess-CPext, ChannelAccess-CPext-CAPC, or any other suitable channel access parameter.

In another aspect, the CCA timing configuration module 908 is configured to perform, based on an indication to change the first CCA duration to a second CCA duration different from the first CCA duration, the CCA over the second CCA duration. For example, as explained above, the CCA may be associated with a first CCA timing configuration defining a first CCA duration. For example, the request to perform the CCA may include a request to perform a type 1 CCA. The type 1 CCA may include a LBT CAT4, and the first CCA timing configuration may include or indicate a fixed defer period (e.g., 16 μs+m*9 μs), and a random backoff period associated with a random integer N (e.g., N*9 μs). The value m may be an integer value between 1 and 4 associated with a priority class of the UE-BS communications. In some aspects, the indication may be provided or transmitted by the BS. For example, the CCA timing configuration module 908 may receive, from the BS, an indication to perform the CCA based on the second CCA timing configuration instead of the first CCA timing configuration. In one aspect, the value of N may be signaled and received by the UE semi-statically. Receiving the indication for the second CCA timing configuration may include receiving a RRC configuration indicating the value of N, and receiving a notification to use the semi-statically configured N value via a MAC-CE. Accordingly, the second CCA duration may be a non-random duration, which is assignable based on network resources, traffic conditions, or any other suitable parameter. In other words, receiving the indication for the second CCA timing configuration may include receiving a non-random value of N that can be used by the CCA timing configuration module 908 instead of a random value to determine the duration of the CCA.

In another aspect, the CCA timing configuration module 908 is configured to receive an indication of an entry of the channel access configuration, where the entry includes a field indicating the value of N, and an additional field indicating the UE to use the second CCA timing configuration and/or the second CCA duration. Thus, the channel access configuration may indicate whether to upgrade to a shorter CCA duration, and how to determine the upgraded or shortened CCA duration.

In another aspect, the CCA timing configuration module 908 is configured implicitly to perform the CCA based on the second CCA timing configuration. For example, receiving the indication to perform the CCA based on the second CCA timing configuration may include receiving a second DCI different from the first DCI. The second DCI may be a DCI 2_0, for example, and may indicate that the scheduled UL communication is associated with a BS-acquired COT. Because the scheduled UL communication is within the BS COT, the CCA timing configuration module 908 may be configured to perform the CCA based on the shorter second CCA duration, which is based on the second CCA timing configuration. In another aspect, the CCA timing configuration module 908 may be implicitly indicated to perform the CCA based on the second CCA timing configuration based on a time gap between the last or most recent DL transmission (e.g., DCI, PDSCH), and the scheduled UL communication. The CCA timing configuration module 908 may compare the time gap to a preconfigured threshold, such as 23 μs. In this regard, the threshold may be based on the first CCA duration and/or first CCA timing configuration. For example, the threshold may be based on a minimum CCA duration allowed by the first CCA timing configuration, or a maximum CCA duration allowed by the first CCA timing configuration. Accordingly, if the CCA timing configuration module 908 determines that the time gap is less than the threshold, the CCA timing configuration module 908 may be implicitly indicated to use the second CCA timing configuration and/or second CCA duration to perform the CCA. If the CCA timing configuration module 908 determines that the time gap is greater than the threshold, the CCA timing configuration module 908 may be implicitly indicated to use the first CCA timing configuration and/or first CCA duration (e.g., CAT4 LBT with random backoff) to perform the CCA.

In another aspect, the CCA timing configuration module 908 may be configured to transmit the UL communication if the CCA results in a pass. Transmitting the UL communication may include transmitting UL control information and/or UL data in a PUSCH. The time resources of UL communication may be indicated in the scheduling DCI. In some aspects, the time resources of the UL communication may be based on the second CCA timing configuration and/or the second CCA duration.

As shown, the transceiver 910 may include the modem subsystem 912 and the RF unit 914. The transceiver 910 can be configured to communicate bi-directionally with other devices, such as the BSs 105 and 1300. The modem subsystem 912 may be configured to modulate and/or encode the data from the memory 904 and/or the CCA timing configuration module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., PUSCH data, PUCCH UCI, sidelink transmissions, etc.) from the modem subsystem 912 (on outbound transmissions) or of transmissions originating from another source such as a UE 115, a BS 105, or an anchor. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 900 to enable the UE 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., RRC configurations, PDSCH data, PDCCH DCI, etc.) to the CCA timing configuration module 908 for processing. The antennas 916 may include multiple antennas of similar or different designs in order to sustain multiple transmission links.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Further, in some aspects, the processor 902 is configured to communicate with various components of the UE 900 to perform a clear channel assessment (CCA) based on one or more CCA timing configurations, as explained above. The transceiver 910 is coupled to the processor 902 and configured to transmit, after the CCA based on a second CCA timing configuration, a scheduled UL communication.

Figure 10:
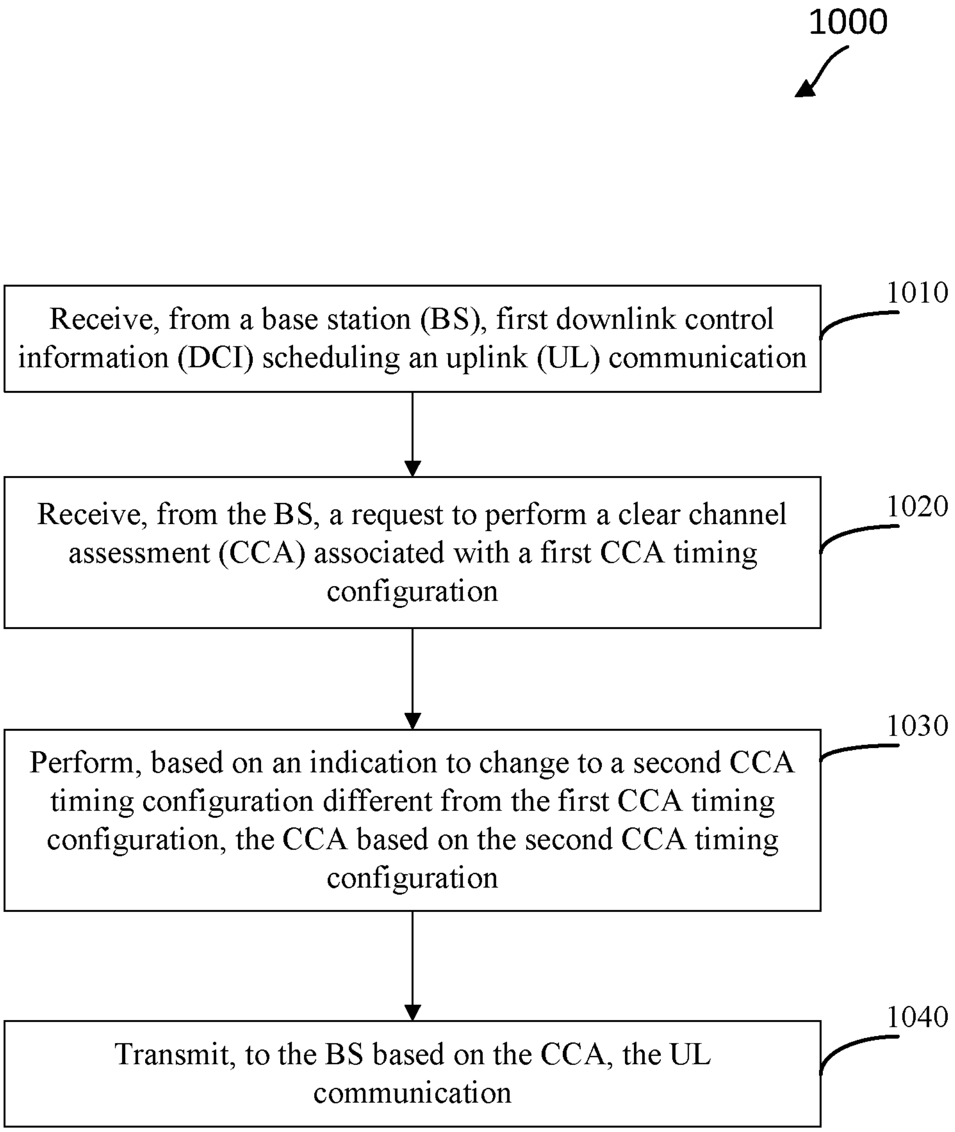
FIG. 10 is a flow diagram of a wireless communication method according to some aspects of the present disclosure.

FIG. 10 is a flow diagram illustrating a wireless communication method 1000 according to some aspects of the present disclosure. Aspects of the method 1000 can be executed by a computing device (e.g., a processor, processing circuit, and/or other suitable component) of a wireless communication device or other suitable means for performing the blocks. For example, a UE, such as the UE 115 or the UE 900, may utilize one or more components, such as the processor 902, the memory 904, the CCA timing configuration module 908, the transceiver 910, the modem 912, the RF unit 914, and the one or more antennas 916, to execute the blocks of method 1000. The method 1000 may employ similar mechanisms as described in FIGS. 1-7. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1010, the UE receives, from a BS, first downlink control information (DCI) scheduling an uplink (UL) communication. In some aspects, the UE may receive a DCI having a format 0_0 or 0_1. The DCI may indicate a time resource associated with the scheduled UL communication. For example, the DCI may indicate an entry, row, or index of a time domain resource allocation (TDRA) table. In some aspects, the DCI is received in a BS-acquired channel occupancy time (COT). The UE 900 may use one or more components, including the processor 902, the memory 904, the CCA timing configuration module 908, the transceiver 910, and/or the antennas 916, to perform the actions of block 1010.

At block 1020, the UE receives, from the BS, a request to perform a clear channel assessment (CCA) associated with a first CCA timing configuration. In some aspects, block 1020 may include receiving a request to perform a listen-before-talk (LBT) procedure. Receiving the request may include receiving an indication of a channel access configuration. In some aspects, the request may be carried in the DCI received at block 1010. In this regard, in some aspects, block 1020 may include receiving the DCI received at block 1010, where the DCI indicates the request to perform the CCA. The request may include an indication of an entry index of a channel access table carried in the DCI, where each row or entry of the channel access table indicates a type of CCA to be performed. Each row or entry of the table may also indicate a cyclic prefix extension index, and/or a channel access priority class (CAPC) associated with the indicated type of CCA. For example, block 1020 may include receiving a ChannelAccess-CPext, ChannelAccess-CPext-CAPC, or any other suitable channel access parameter.

The CCA request may be associated with the first CCA timing configuration, as mentioned above. For example, the UE may be configured with one or more CCA timing configurations including the first CCA timing configuration. In one aspect, each row or entry of a configured channel access table may be associated with a CCA timing configuration defining the duration of the CCA. For example, the UE may be configured with the first CCA timing configuration including a defer period and a random backoff period. The random backoff period may be based on an integer multiple of a constant. For example, the first timing configuration may specify the defer period as 16 μs+m*9 μs, were m is associated with the priority class (e.g., CAPC) of the scheduled UL communication. The random backoff period may involve an additional period of N*9 μs, where N is an integer. In some aspects, N may be a random integer determined or selected by the UE. In another aspect, N may be a non-random value that is assignable based on an indication from the BS. For example, in some aspects, the UE may receive the indication of the entry or row of the channel access table, where the entry or row indicates the value N. To perform a shorter CCA, the UE may receive an indication setting the value of N to 0 or 1, for example. However, the UE may be indicated with any suitable value of N, including 0, 1, 2, 3, 5, 7, or any other suitable value, both greater or smaller. In another aspect, the CCA request may indicate a fixed CCA duration that is not based on N. For example, the CCA request may indicate a fixed CCA duration of 8 μs. In another aspect, the CCA request may indicate a CCA duration of 0 μs. That is, the CCA request may include an indication to refrain from performing the CCA.

In another aspect, the UE may be configured with other CCA timing configurations defining other CCA durations. For example, as explained below, the UE me be configured with a shortened or upgraded CCA timing configuration which may be used by the UE based on one or more conditions and/or indications. For example, the UE may be configured with a second CCA timing configuration different from the first CCA timing configuration. The second CCA timing configuration may be non-random, for example. In one aspect, the second CCA timing configuration may define a second CCA duration as 8 μs+N*5 μs, where N is an integer value that is assignable and/or indicated by the BS. The UE 900 may use one or more components, including the processor 902, the memory 904, the CCA timing configuration module 908, the transceiver 910, and/or the antennas 916, to perform the actions of block 1020.

At block 1030, the UE performs, based on an indication to change to a second CCA timing configuration different from the first CCA timing configuration, the CCA based on the second CCA timing configuration. For example, as explained above, the CCA requested at block 1020 may be associated with a first CCA timing configuration defining a first CCA duration. For example the request to perform the CCA may include a request to perform a type 1 CCA. The type 1 CCA may include a LBT CAT4, and the first CCA timing configuration may include or indicate a fixed defer period (e.g., 16 μs+m*9 μs), and a random backoff period associated with a random integer N (e.g., N*9 μs). The value m may be an integer value between 1 and 4 associated with a priority class (e.g., CAPC) of the UE-BS communications. In some aspects, the indication may be provided or transmitted by the BS. For example, the UE may receive, from the BS, an indication to perform the CCA based on the second CCA timing configuration instead of the first CCA timing configuration. In one aspect, the value of N may be signaled and received by the UE semi-statically. Receiving the indication for the second CCA timing configuration may include receiving a RRC configuration indicating the value of N, and receiving a notification to use the semi-statically configured N value via a MAC-CE. Accordingly, the second CCA timing configuration may indicate or define a non-random duration, which is assignable based on network resources, traffic conditions, or any other suitable parameter. In other words, receiving the indication for the second CCA timing configuration may include receiving a non-random value of N that can be used by the UE instead of a random value to determine the duration of the CCA.

In another aspect, the UE may receive the indication of the second CCA timing configuration and/or the value of N dynamically, via DCI. For example, the value of N may be indicated in the DCI received at block 1010. In one example, receiving the indication of the value of N may include receiving the DCI received at block 1010, where the DCI indicates an entry index or row of the configured channel access table, and at least one entry or row indicates a value of N. In another aspect, the value of N may be preconfigured and fixed in the UE configurations (e.g., hard-coded based on network specification). The UE may be configured to use the pre-configured, non-random value of N based on operating conditions, including the frequency band of the scheduled UL communication. For example, the UE may be configured to use the second CCA timing configuration, including the non-random value of N, if the scheduled UL communication is associated with frequencies in the FR2X range of frequencies, including the 60 GHz band.

In another aspect, receiving the indication of the second CCA timing configuration may include receiving an indication of an entry of the channel access configuration, where the entry includes a field indicating the value of N, and an additional field indicating the UE to use the second CCA timing configuration and/or the second CCA duration. Thus, the channel access configuration may indicate whether to upgrade to a shorter CCA duration, and how to determine the upgraded or shortened CCA duration.

In another aspect, the UE may be indicated implicitly to perform the CCA based on the second CCA timing configuration. For example, receiving the indication to perform the CCA based on the second CCA timing configuration may include receiving a second DCI different from the first DCI. The second DCI may be a DCI 2_0, for example, and may indicate that the scheduled UL communication is associated with a BS-acquired COT. Because the scheduled UL communication is within the BS COT, the UE may perform the CCA based on the shorter second CCA duration, which is based on the second CCA timing configuration. In another aspect, the UE may be implicitly indicated to perform the CCA based on the second CCA timing configuration based on a time gap between the last or most recent DL transmission (e.g., DCI, PDSCH), and the scheduled UL communication. The UE may compare the time gap to a preconfigured threshold, such as 23 μs. In this regard, the threshold may be based on the first CCA duration and/or first CCA timing configuration. For example, the threshold may be based on a minimum CCA duration allowed by the first CCA timing configuration, or a maximum CCA duration allowed by the first CCA timing configuration. Accordingly, if the UE determines that the time gap is less than the threshold, the UE may be implicitly indicated to use the second CCA timing configuration and/or second CCA duration to perform the CCA. If the UE determines that the time gap is greater than the threshold, the UE may be implicitly indicated to use the first CCA timing configuration and/or first CCA duration (e.g., CAT4 LBT with random backoff) to perform the CCA.

Performing the CCA may include measuring signal energy (e.g., RSRP) in the shared frequency band during the second CCA duration, and comparing the measured signal energy to a preconfigured energy detection (ED) threshold. In some aspects, the ED threshold may be statically configured by the network based on the network specification (e.g., 3GPP specification). In other aspects, the ED threshold may be semi-statically configured, and/or dynamically signaled. In some aspects, performing the CCA may be comparing two or more signal energy measurements to two or more thresholds. For example, performing the CCA may include comparing signal energy measurements from a first portion of the CCA duration to a first threshold, and comparing signal energy measurements from a second portion of the CCA duration to a second threshold different form the first threshold. The UE 900 may use one or more components, including the processor 902, the memory 904, the CCA timing configuration module 908, the transceiver 910, and/or the antennas 916, to perform the actions of block 1030.

Performing the CCA may result in a fail or in a pass. If the CCA results in a pass, the UE transmits the UL communication to the BS at block 1040. In this regard, transmitting the UL communication may include transmitting UL control information and/or UL data in a PUSCH. The time resources of UL communication may be indicated in the DCI received at block 1010. In some aspects, the time resources of the UL communication may be based on the second CCA timing configuration and/or the second CCA duration. For example, if the BS indicates the UE to use a shorter second CCA duration to perform the LBT, the BS may schedule the UL communication with a shorter gap, since a longer gap associated with a longer CCA duration (e.g., CAT4 LBT with random backoff) is not necessary. In this way, the chance of a collision or interference in the time gap between the indication of the BS COT and the scheduled UL communication is reduced. Further, the COT overhead may also be reduced. The UE 900 may use one or more components, including the processor 902, the memory 904, the CCA timing configuration module 908, the transceiver 910, and/or the antennas 916, to perform the actions of block 1040.

Although the method 1000 is described with the context of a scheduled UL communication, it will be understood that various aspects of the method 1000 may be used in other contexts and scenarios. For example, in some aspects, the UE may receive an indication of a request to perform a CCA for receiver-assisted channel access, where one or more UEs perform additional channel sensing to determine whether a shared frequency band is available. In this regard, the UE may be indicated to perform an upgraded or shortened CCA, as explained above, but may not transmit a scheduled UL communication.

Figure 11:
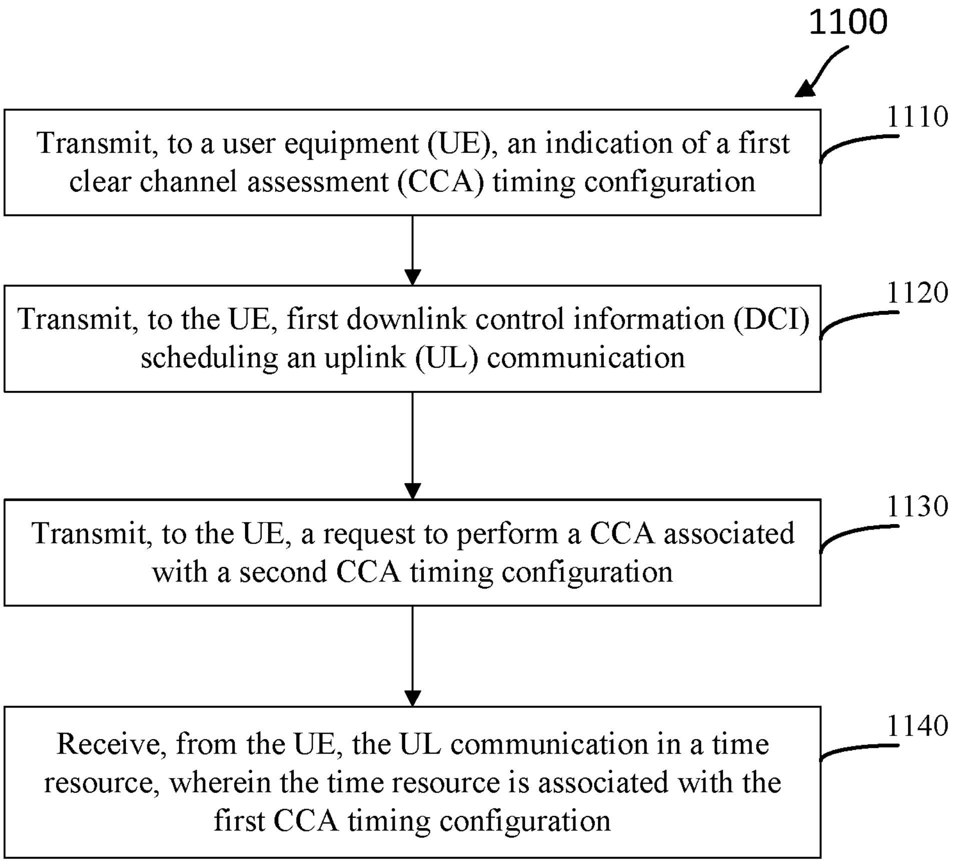
FIG. 11 is a flow diagram of a wireless communication method according to some aspects of the present disclosure.

FIG. 11 is a flow diagram illustrating a wireless communication method 1100 according to some aspects of the present disclosure. Aspects of the method 1100 can be executed by a base station (BS), such as one of the BS 105 of the network 100 or the BS 800. For example, the BS 800, may utilize one or more components, such as the processor 802, the memory 804, the CCA timing configuration module 808, the transceiver 810, the modem 812, the RF unit 814, and the one or more antennas 816, to execute the blocks of method 1100. The method 1100 may employ similar mechanisms as described in FIGS. 1-7. As illustrated, the method 1100 includes a number of enumerated blocks, but aspects of the method 1100 may include additional blocks before, after, and in between the enumerated blocks. In some aspects, one or more of the enumerated blocks may be omitted or performed in a different order.

At block 1110, the BS transmits, to a UE, an indication of a first CCA timing configuration. As explained further below, the first CCA timing configuration may be used by the UE instead of a second CCA timing configuration associated with a CCA request. For example, the BS may indicate the UE to perform a CCA of a first type (e.g., CAT4 LBT), where the first type of CCA is associated with a second CCA timing configuration (e.g., defer period with a random backoff). The first CCA timing configuration transmitted by the BS at block 1110 may be used by the UE instead of the second CCA timing configuration to shorten the duration of the CCA, for example. In one aspect, block 1110 may include transmitting an indication of a non-random CCA timing configuration. For example, the first CCA timing configuration may define a CCA duration as 8 μs+N*5 μs, where Nis an integer value that is assignable and/or indicated by the BS. In this regard, in some aspects, block 1110 may include indicating the value of N. The BS may indicate, to the UE, the value of N using RRC signaling, MAC-CE, and/or DCI. For example, the BS may semi-statically indicate the value of N via RRC signaling, and may activate the value of N by transmitting a MAC-CE in a PDSCH. In another aspect, the BS may dynamically indicate the value of N via DCI. For example, in some aspects, the BS may transmit an indication of an entry or row of a channel access table, where the entry or row indicates the value N. To indicate a shorter CCA, the BS may transmit an indication setting the value of N to 0 or 1, for example. However, the BS may indicate the UE with any suitable value of N, including 0, 1, 2, 3, 5, 7, or any other suitable value, both greater or smaller. In another aspect, the CCA request may indicate a fixed CCA duration that is not based on N. For example, the CCA request may indicate a fixed CCA duration of 8 μs. In another aspect, the CCA request may indicate a CCA duration of 0 μs. That is, the CCA request may include an indication to refrain from performing the CCA. The BS 800 may use one or more components, including the processor 802, the memory 804, the CCA timing configuration module 808, the transceiver 810, and/or the antennas 816, to perform the actions of block 1110.

At block 1120, the BS transmits, to the UE, first downlink control information (DCI) scheduling an uplink (UL) communication. In some aspects, the BS may transmit a DCI having a format 0_0 or 0_1. The DCI may indicate a time resource associated with the scheduled UL communication. For example, the DCI may indicate an entry, row, or index of a time domain resource allocation (TDRA) table. In some aspects, the DCI is transmitted in a BS-acquired channel occupancy time (COT). In one aspect, the DCI may carry a dynamic indication of the first CCA timing configuration transmitted at block 1110. In other words, in some aspects, block 1120 may include the actions of block 1110. The BS 800 may use one or more components, including the processor 802, the memory 804, the CCA timing configuration module 808, the transceiver 810, and/or the antennas 816, to perform the actions of block 1120.

At block 1130, the BS transmits, to the UE, a DL signal indicating request to perform a clear channel assessment (CCA) associated with a second CCA timing configuration. For example, in some aspects, block 1130 may include transmitting a request to perform a LBT procedure. Transmitting the DL signal may include transmitting an indication of a channel access configuration. In some aspects, the request may be carried in the DCI transmitted at block 1120. In this regard, in some aspects, block 1130 may include transmitting the DCI at block 1120, where the DCI indicates both the scheduled UL communication and the request to perform the CCA. Accordingly, in some aspects, blocks 1110, 1120, and 1130 may be performed by transmitting a DCI indicating the first CCA timing configuration, a UL scheduling grant, and a request to perform a CCA associated with a second CCA timing configuration different from the first timing configuration. The request may include an indication of an entry index of a channel access table carried in the DCI, where each row or entry of the channel access table indicates a type of CCA to be performed. Each row or entry of the table may also indicate a cyclic prefix extension index, and/or a channel access priority class (CAPC) associated with the indicated type of CCA. For example, block 1130 may include transmitting a ChannelAccess-CPext, ChannelAccess-CPext-CAPC, or any other suitable channel access parameter.

The CCA request may be associated with a second CCA duration and/or second CCA timing configuration, as mentioned above. For example, the UE may be configured with one or more CCA timing configurations including the first CCA timing configuration and the second CCA timing configuration, where a first CCA duration is based on the first CCA timing configuration and a second CCA duration is based on the second CCA timing configuration. In one aspect, each row or entry of a configured channel access table may be associated with a CCA timing configuration defining the duration of the CCA. In some aspects, the indication of the CCA request may indicate the UE to perform a type of CCA associated with the second CCA timing configuration, where the second CCA timing configuration includes a defer period and a random backoff period. The random backoff period may be based on an integer multiple of a constant. For example, the first timing configuration may specify the defer period as 16 μs+m*9 μs, were m is associated with the priority class (e.g., CAPC) of the scheduled UL communication. The random backoff period may involve an additional period of N*9 μs, where N is an integer. In some aspects, N may be a random integer determined or selected by the UE.

In another aspect, transmitting the request to perform the CCA may include transmitting an indication of an entry of the channel access configuration, where the entry includes a field indicating the value of N, and an additional field indicating the UE to use the second CCA timing configuration and/or the second CCA duration. Thus, the channel access configuration may indicate whether to upgrade to a shorter CCA duration, and how to determine the upgraded or shortened CCA duration.

In another aspect, the UE may be indicated implicitly to perform the CCA based on the first CCA timing configuration. For example, transmitting the DL signal indicating the UE to perform the CCA based on the first CCA timing configuration may include transmitting a second DCI different from the first DCI. The second DCI may be a DCI 2_0, for example, and may indicate that the scheduled UL communication is associated with a BS-acquired COT. Because the scheduled UL communication is within the BS COT, the UE may perform the CCA based on the shorter first CCA duration, which is based on the first CCA timing configuration. In another aspect, the BS may implicitly indicate the UE to perform the CCA based on the second CCA timing configuration based on a time gap between the last or most recent DL transmission (e.g., DCI, PDSCH), and the scheduled UL communication. As explained above, the UE may compare the time gap to a preconfigured threshold, such as 23 μs. In this regard, the threshold may be based on the second CCA duration and/or second CCA timing configuration. For example, the threshold may be based on a minimum CCA duration allowed by the second CCA timing configuration, or a maximum CCA duration allowed by the second CCA timing configuration. Accordingly, if the time gap is less than the threshold, the BS may implicitly indicate the UE to use the first CCA timing configuration to perform the CCA. The BS 800 may use one or more components, including the processor 802, the memory 804, the CCA timing configuration module 808, the transceiver 810, and/or the antennas 816, to perform the actions of block 1130.

If the CCA results in a pass, the BS receives the UL communication from the UE in a time resource at block 1140. The time resource of the scheduled UL communication may be based on the first CCA timing configuration indicated at block 1110. For example, the first CCA timing configuration may be associated with a shorter CCA duration than the second CCA timing configuration. Accordingly, the BS may schedule the UL communication at block 1120 with a shorter gap between the scheduling DCI and the scheduled UL communication, since a longer gap associated with a longer CCA duration (e.g., CAT4 LBT with random backoff) is not used. In this way, the chance of a collision or interference in the time gap between the indication of the BS COT and the scheduled UL communication is reduced. Further, the COT overhead may also be reduced. The BS 800 may use one or more components, including the processor 802, the memory 804, the CCA timing configuration module 808, the transceiver 810, and/or the antennas 816, to perform the actions of block 1140.

Although the method 1100 is described with the context of a scheduled UL communication, it will be understood that various aspects of the method 1100 may be used in other contexts and scenarios. For example, in some aspects, the BS may transmit an indication of a request to perform a CCA for receiver-assisted channel access, where one or more UEs perform additional channel sensing to determine whether a shared frequency band is available. In this regard, the BS may indicate the UE to perform an upgraded or shortened CCA, as explained above, but may not receive a scheduled UL communication.

Figure 12:
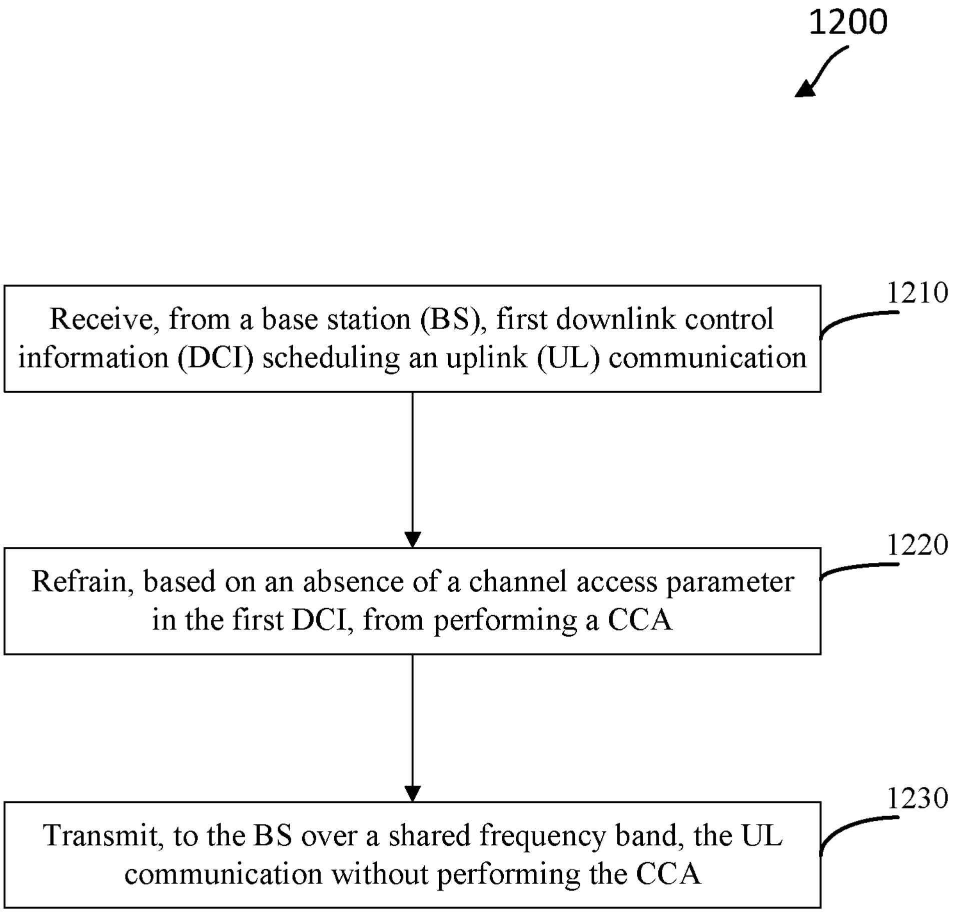
FIG. 12 is a flow diagram of a wireless communication method according to some aspects of the present disclosure.

FIG. 12 is a flow diagram illustrating a wireless communication method 1200 according to some aspects of the present disclosure. Aspects of the method 1200 can be executed by a computing device (e.g., a processor, processing circuit, and/or other suitable component) of a wireless communication device or other suitable means for performing the blocks. For example, a wireless communication device, such as the UE 115 or the UE 900, may utilize one or more components, such as the processor 902, the memory 904, the CCA timing configuration module 908, the transceiver 910, the modem 912, the RF unit 914, and the one or more antennas 916, to execute the blocks of method 1200. The method 1200 may employ similar mechanisms as described in FIGS. 1-7. As illustrated, the method 1200 includes a number of enumerated blocks, but aspects of the method 1200 may include additional blocks before, after, and in between the enumerated blocks. In some aspects, one or more of the enumerated blocks may be omitted or performed in a different order.

At block 1210, the UE receives, from a BS, first downlink control information (DCI) scheduling an uplink (UL) communication. In some aspects, the UE may receive a DCI having a format 0_0 or 0_1. The DCI may indicate a time resource associated with the scheduled UL communication. For example, the DCI may indicate an entry, row, or index of a time domain resource allocation (TDRA) table. In some aspects, the DCI is received in a BS-acquired channel occupancy time (COT). The UE 900 may use one or more components, including the processor 902, the memory 904, the CCA timing configuration module 908, the transceiver 910, and/or the antennas 916, to perform the actions of block 1210.

At block 1220, the UE refrains, based on an absence of a channel access parameter in the first DCI, the CCA. For example, the UE may decode the DCI received at block 1210 and check for the channel access parameter. The channel access parameter may include a value or indication in a channel access field carried in the DCI. In some aspects, the UE may determine that the channel access parameter is absent by determining that the DCI does not include the channel access field. In another aspect, the UE may determine that the channel access parameter is absent by determining that the channel access field is empty, or indicates a null value. In some aspects, the field may include a ChannelAccess-CPext, ChannelAccess-CPext-CAPC, or any other suitable field. The UE 900 may use one or more components, including the processor 902, the memory 904, the CCA timing configuration module 908, the transceiver 910, and/or the antennas 916, to perform the actions of block 1220.

At block 1230, the UE transmits, over a shared frequency band, the UL communication to the BS without performing the CCA. Transmitting the UL communication may include transmitting UL control information and/or UL data in a PUSCH. In some aspects, transmitting the UL communication may include transmitting the UL communication in a BS COT. Further, transmitting the UL communication may include transmitting the scheduled UL communication based on a signal power or energy budget (e.g., 10% budget for contention exempt control transmissions). In some aspects, whether the UE transmits the UL communication based on the signal power or energy budget may be based on a type of the UL communication (e.g., short control signaling, UL data), and/or whether a second DCI was received indicating a BS COT. For example, if the UE previously received a DCI (e.g., DCI 2_0) indicating that the UL communication is scheduled in a BS COT, the UE may transmit the UL communication without power or energy restrictions. If the UE has not been indicated that the UL communication is scheduled in a BS COT, the UE may transmit the UL communication based on the signal power or energy budget restrictions. However, if the UE may not been indicated that the UL communication is scheduled in a BS COT (e.g., UE did not receive DCI 2_0), and the scheduled UL communication is not defined as short control signaling, the UE may assume that the scheduled UL communication is scheduled in the BS COT, and may transmit the UL communication at full power and/or otherwise without regard to contention exempt restrictions. The UE 900 may use one or more components, including the processor 902, the memory 904, the CCA timing configuration module 908, the transceiver 910, and/or the antennas 916, to perform the actions of block 1230.

Further aspects of the present disclosure include the following:

1. A method of wireless communication performed by a user equipment (UE), the method comprising:
   receiving, from a base station (BS), first downlink control information (DCI) scheduling an uplink (UL) communication;
   receiving, from the BS, a request to perform a clear channel assessment (CCA) associated with a first CCA timing configuration,
   performing, based on an indication to change to a second CCA timing configuration different from the first CCA timing configuration, the CCA based on the second CCA timing configuration; and
   transmitting, to the BS based on the CCA, the UL communication.
2. The method of clause 1, wherein:
   the first CCA timing configuration is based on a random counter value,
   the indication includes an indication of a non-random counter value,
   the method further includes:
      determining, based on the non-random counter value, a duration of the CCA.
3. The method of clause 2, wherein the non-random counter value is one of:
   a statically-configured counter value; or
   a semi-statically configured value.
4. The method of any of clauses 1-3, further comprising:
   receiving, from the BS, a downlink (DL) communication including the indication to change to the second CCA timing configuration.
5. The method of clause 4, wherein the receiving the DL communication includes receiving the first DCI.
6. The method of clause 5, wherein the first DCI indicates:
   the request to perform the CCA associated with the first CCA timing configuration; and
   the indication to change to the second CCA timing configuration.

7. The method of any of clauses 5 or 6, wherein the indication to change to the second CCA timing configuration is based on an absence of a channel access parameter in the first DCI.

8. The method of clause 4, wherein the receiving the DL communication includes receiving a second DCI different from the first DCI, wherein the second DCI indicates a time resource associated with a BS-initiated channel occupancy time (COT), and wherein the transmitting the UL communication comprises transmitting the UL communication in the BS-initiated COT.

9 The method of any of clauses 4-8, wherein the performing the CCA is based on a time gap between a first time resource of the DL communication and a second time resource of the UL communication.

10. A method of wireless communication performed by a user equipment (UE), the method comprising:

receiving, from a base station (BS), first downlink control information (DCI) scheduling an uplink (UL) communication;

refraining, based on an absence of a channel access parameter in the first DCI, from performing a clear channel assessment (CCA); and transmitting, to the BS over a shared frequency band, the UL communication without performing the CCA.

11. The method of clause 10, further comprising:

monitoring for a second DCI indicating a time resource of a BS-initiated channel occupancy time (COT); and wherein the transmitting the UL communication comprises:

transmitting, based on the monitoring for the second DCI and a type of the UL communication, the UL communication.

12. The method of clause 11, wherein:

the UL communication includes a UL control signal, the transmitting the UL communication is further based on a transmission power configuration, and the transmission power configuration is based on the monitoring for the second DCI.

13. The method of any of clauses 11 or 12, wherein:

the UL communication is a UL data communication, the transmitting the UL communication comprises transmitting the UL data communication in the BS-initiated COT.

14. A method of wireless communication performed by a base station (BS), the method comprising:

transmitting, to a user equipment (UE), an indication of a first clear channel assessment (CCA) timing configuration;

transmitting, to the UE, first downlink control information (DCI) scheduling an uplink (UL) communication;

transmitting, to the UE, a request to perform a CCA associated with a second CCA timing configuration; and receiving, from the UE, the UL communication in a time resource, wherein the time resource is associated with the first CCA timing configuration.

15. The method of clause 14, wherein:

the second CCA timing configuration is based on a random counter value, the first CCA timing configuration is based on a non-random counter value, the method further includes:

determining, based on the non-random counter value, a duration of the CCA.

16. The method of clause 15, wherein the non-random counter value is one of:

a statically-configured counter value; or a semi-statically configured value.

17. The method of clause 16, wherein the transmitting the indication of the first CCA timing configuration includes transmitting the DCI scheduling the UL communication, wherein the DCI includes a channel access filed indicating the non-random counter value.

18. The method of any of clauses 14-17, further comprising: transmitting, to the UE, an indication to change to the first CCA timing configuration.

19. The method of clause 18, wherein the transmitting the indication includes the transmitting the first DCI.

20. The method of clause 19, wherein the first DCI indicates:

the request to perform the CCA; and the indication to change to the first CCA timing configuration.

21. The method of any of clauses 19 or 20, wherein the indication to change to the first CCA timing configuration is based on an absence of a channel access parameter in the first DCI.

22. The method of clause 18, wherein the transmitting the indication comprises transmitting a second DCI different from the first DCI, wherein the second DCI indicates a time resource associated with a BS-initiated channel occupancy time (COT), and wherein the receiving the UL communication comprises receiving the UL communication in the BS-initiated COT.

23. A user equipment (UE), comprising:

a transceiver; and a processor in communication with the transceiver and configured to:

cause the transceiver to:

receive, from a base station (BS), first downlink control information (DCI) scheduling an uplink (UL) communication;

receive, from the BS, a request to perform a clear channel assessment (CCA) associated with a first CCA timing configuration, perform, based on an indication to change to a second CCA timing configuration different from the first CCA timing configuration, the CCA based on the second CCA timing configuration; and cause the transceiver to:

transmit, to the BS based on the CCA, the UL communication.

24. The UE of clause 23, wherein:

the first CCA timing configuration is based on a random counter value, the indication includes an indication of a non-random counter value, the processor is further configured to:

determine, based on the non-random counter value, a duration of the CCA.

25. The UE of any of clauses 23 or 24, wherein the processor is configured to cause the transceiver to:

receive, from the BS, a downlink (DL) communication including the indication to change to the second CCA timing configuration.

26. The UE of clause 25, wherein the processor configured to cause the transceiver to receive the DL communication includes the processor configured to cause the transceiver to receive the first DCI.

27. The UE of clause 26, wherein the first DCI indicates:

the request to perform the CCA associated with the first CCA timing configuration; and the indication to change to the second CCA timing configuration.

28. The UE of any of clauses 26 or 27, wherein the indication to change to the second CCA timing configuration is based on an absence of a channel access parameter in the first DCI.
29. The UE of clause 25,
    wherein the processor configured to cause the transceiver to receive the DL communication includes the processor configured to cause the transceiver to receive a second DCI different from the first DCI,
    wherein the second DCI indicates a time resource associated with a BS-initiated channel occupancy time (COT), and
    wherein the processor is configured to cause the transceiver to transmit the UL communication in the BS-initiated COT.
30. The UE of any of clauses 25 or 26, wherein the processor is configured to perform the CCA based on a time gap between a first time resource of the DL communication and a second time resource of the UL communication.
31. A user equipment (UE), comprising:
    a transceiver; and
    a processor in communication with the transceiver and configured to:
        cause the transceiver to receive, from a base station (BS), first downlink control information (DCI) scheduling an uplink (UL) communication;
        refrain, based on an absence of a channel access parameter in the first DCI, from performing a clear channel assessment (CCA); and
        cause the transceiver to transmit, to the BS over a shared frequency band, the UL communication without performing the CCA.
32. The UE of clause 31, wherein the processor is further configured to:
    monitor for a second DCI indicating a time resource of a BS-initiated channel occupancy time (COT); and
    wherein the processor configured to cause the transceiver to transmit the UL communication comprises the processor configured to cause the transceiver to:
        transmit, based on the monitoring for the second DCI and a type of the UL communication, the UL communication.
33. The UE of clause 32, wherein:
    the UL communication includes a UL control signal,
    the processor is configured to cause the transceiver to transmit the UL communication further based on a transmission power configuration, and
    the transmission power configuration is based on the monitoring for the second DCI.
34. The UE of clause 32, wherein:
    the UL communication is a UL data communication,
    the processor is configured to cause the transceiver to transmit the UL data communication in the BS-initiated COT.
35. A base station (BS), comprising:
    a transceiver; and
    a processor in communication with the transceiver and configured to cause the transceiver to:
        transmit, to a user equipment (UE), an indication of a first clear channel assessment (CCA) timing configuration;
        transmit, to the UE, first downlink control information (DCI) scheduling an uplink (UL) communication;
        transmit, to the UE, a request to perform a CCA associated with a second CCA timing configuration; and
        receive, from the UE, the UL communication in a time resource, wherein the time resource is associated with the first CCA timing configuration.
36. The BS of clause 35, wherein:
    the second CCA timing configuration is based on a random counter value,
    the first CCA timing configuration is based on a non-random counter value, and
    the processor is further configured to:
        determine, based on the non-random counter value, a duration of the CCA.
37. The BS of clause 36, wherein the non-random counter value is one of:
    a statically-configured counter value; or
    a semi-statically configured value.
38. The BS of clause 37, wherein the processor configured to cause the transceiver to transmit the indication of the first CCA timing configuration includes the processor configured to cause the transceiver to transmit the DCI scheduling the UL communication, and wherein the DCI includes a channel access filed indicating the non-random counter value.
39. The BS of any of clauses 35-38, wherein the processor is further configured to cause the transceiver to:
    transmit, to the UE, an indication to change to the first CCA timing configuration.
40. The BS of clause 39, wherein the processor configured to cause the transceiver to transmit the indication includes the processor configured to cause the transceiver to transmit the first DCI.
41. The BS of clause 40, wherein the first DCI indicates:
    the request to perform the CCA; and
    the indication to change to the first CCA timing configuration.
42. The BS of any of clauses 40 or 41, wherein the indication to change to the first CCA timing configuration is based on an absence of a channel access parameter in the first DCI.
43. The BS of clause 39, wherein the processor configured to cause the transceiver to transmit the indication comprises processor configured to cause the transceiver to transmit a second DCI different from the first DCI, wherein the second DCI indicates a time resource associated with a BS-initiated channel occupancy time (COT), and wherein the processor is configured to cause the transceiver to receive the UL communication in the BS-initiated COT.
44. A non-transitory, computer-readable medium having program code recorded thereon, the program code comprising:
    code for causing a user equipment (UE) to receive, from a base station (BS), first downlink control information (DCI) scheduling an uplink (UL) communication;
    code for causing the UE to receive, from the BS, a request to perform a clear channel assessment (CCA) associated with a first CCA timing configuration,
    code for causing the UE to perform, based on an indication to change to a second CCA timing configuration different from the first CCA timing configuration, the CCA based on the second CCA timing configuration; and
    code for causing the UE to transmit, to the BS based on the CCA, the UL communication.
45. The non-transitory, computer-readable medium of clause 44, wherein:
    the first CCA timing configuration is based on a random counter value, the indication includes an indication of a non-random counter value, the program code further comprises:

code for causing the UE to determine, based on the non-random counter value, a duration of the CCA.

46. The non-transitory, computer-readable medium of any of clauses 44 or 45, wherein the program code further comprises:

code for causing the UE to receive, from the BS, a downlink (DL) communication including the indication to change to the second CCA timing configuration.

47. The non-transitory, computer-readable medium of clause 46, wherein the code for causing the UE to receive the DL communication includes code for causing the UE to receive the first DCI.

48. The non-transitory, computer-readable medium of clause 47, wherein the first DCI indicates:

the request to perform the CCA associated with the first CCA timing configuration; and the indication to change to the second CCA timing configuration.

49. The non-transitory, computer-readable medium of clause 48, wherein the indication to change to the second CCA timing configuration is based on an absence of a channel access parameter in the first DCI.

50. The non-transitory, computer-readable medium of clause 47, wherein the code for causing the UE to receive the DL communication includes code for causing the UE to receive a second DCI different from the first DCI, wherein the second DCI indicates a time resource associated with a BS-initiated channel occupancy time (COT), and wherein the code for causing the UE to transmit the UL communication comprises code for causing the UE to transmit the UL communication in the BS-initiated COT.

51. The non-transitory, computer-readable medium of any of clauses 47-50, wherein the program code further comprises code for causing the UE to perform the CCA based on a time gap between a first time resource of the DL communication and a second time resource of the UL communication.

52. A non-transitory, computer-readable medium having program code recorded thereon, the program code comprising:

code for causing a user equipment (UE) to receive, from a base station (BS), first downlink control information (DCI) scheduling an uplink (UL) communication;

code for causing the UE to refrain, based on an absence of a channel access parameter in the first DCI, from performing a clear channel assessment (CCA); and code for causing the UE to transmit, to the BS over a shared frequency band, the UL communication without performing the CCA.

53. The non-transitory, computer-readable medium of clause 52, wherein the program code further comprises:

code for causing the UE to monitor for a second DCI indicating a time resource of a BS-initiated channel occupancy time (COT); and wherein the code for causing the UE to transmit the UL communication comprises code for causing the UE to transmit, based on the monitoring for the second DCI and a type of the UL communication, the UL communication.

54. The non-transitory, computer-readable medium of clause 53, wherein:

the UL communication includes a UL control signal, the code for causing the UE to transmit the UL communication comprises code for causing the UE to transmit the UL communication further based on a transmission power configuration, and the transmission power configuration is based on the monitoring for the second DCI.

55. The non-transitory, computer-readable medium of clause 53, wherein:

the UL communication is a UL data communication, the program code further comprises code for causing the UE to transmit the UL data communication in the BS-initiated COT.

56. A non-transitory, computer-readable medium having program code recorded thereon, the program code comprising:

code for causing a base station (BS) to transmit, to a user equipment (UE), an indication of a first clear channel assessment (CCA) timing configuration;

code for causing the BS to transmit, to the UE, first downlink control information (DCI) scheduling an uplink (UL) communication;

code for causing the BS to transmit, to the UE, a request to perform a CCA associated with a second CCA timing configuration; and code for causing the BS to receive, from the UE, the UL communication in a time resource, wherein the time resource is associated with the first CCA timing configuration.

57. The non-transitory, computer-readable medium of clause 56, wherein:

the second CCA timing configuration is based on a random counter value, the first CCA timing configuration is based on a non-random counter value, and the program code further comprises:

code for causing the BS to determine, based on the non-random counter value, a duration of the CCA.

58. The non-transitory, computer-readable medium of clause 57, wherein the non-random counter value is one of:

a statically-configured counter value; or a semi-statically configured value.

59. The non-transitory, computer-readable medium of clause 58, wherein the code for causing the BS to transmit the indication of the first CCA timing configuration includes code for causing the BS to transmit the DCI scheduling the UL communication, and wherein the DCI includes a channel access filed indicating the non-random counter value.

60. The non-transitory, computer-readable medium of clause 56, wherein the program code further comprises:

code for causing the BS to transmit, to the UE, an indication to change to the first CCA timing configuration.

61. The non-transitory, computer-readable medium of clause 60, wherein the code for causing the BS to transmit the indication includes code for causing the BS to transmit the first DCI.

62. The non-transitory, computer-readable medium of clause 61, wherein the first DCI indicates:

the request to perform the CCA; and the indication to change to the first CCA timing configuration.

63. The non-transitory, computer-readable medium of clause 61, wherein the indication to change to the first CCA timing configuration is based on an absence of a channel access parameter in the first DCI.

64. The non-transitory, computer-readable medium of clause 60, wherein the code for causing the BS to transmit the indication comprises code for causing the BS to transmit a second DCI different from the first DCI, wherein the second DCI indicates a time resource associated with a BS-initiated channel occupancy time (COT), and wherein the code for causing the BS to receive the UL communication comprises code for causing the BS to receive the UL communication in the BS-initiated COT.
65. A user equipment (UE), comprising:
means for receiving, from a base station (BS), first downlink control information (DCI) scheduling an uplink (UL) communication;
means for receiving, from the BS, a request to perform a clear channel assessment (CCA) associated with a first CCA timing configuration,
means for performing, based on an indication to change to a second CCA timing configuration different from the first CCA timing configuration, the CCA based on the second CCA timing configuration; and
means for transmitting, to the BS based on the CCA, the UL communication.
66. The UE of clause 65, wherein:
the first CCA timing configuration is based on a random counter value,
the indication includes an indication of a non-random counter value,
the UE further includes:
means for determining, based on the non-random counter value, a duration of the CCA.
67. The UE of clause 66, wherein the non-random counter value is one of:
a statically-configured counter value; or
a semi-statically configured value.
68. The UE of clause 65, further comprising:
means for receiving, from the BS, a downlink (DL) communication including the indication to change to the second CCA timing configuration.
69. The UE of clause 68, wherein the means for receiving the DL communication includes means for receiving the first DCI.
70. The UE of clause 69, wherein the first DCI indicates:
the request to perform the CCA associated with the first CCA timing configuration; and
the indication to change to the second CCA timing configuration.
71. The UE of clause 69, wherein the indication to change to the second CCA timing configuration is based on an absence of a channel access parameter in the first DCI.
72. The UE of clause 68, wherein the means for receiving the DL communication includes means for receiving a second DCI different from the first DCI, wherein the second DCI indicates a time resource associated with a BS-initiated channel occupancy time (COT), and wherein the means for transmitting the UL communication comprises means for transmitting the UL communication in the BS-initiated COT.
73. The UE of clause 68, wherein the means for performing the CCA is based on a time gap between a first time resource of the DL communication and a second time resource of the UL communication.
74. A user equipment (UE), comprising:
means for receiving, from a base station (BS), first downlink control information (DCI) scheduling an uplink (UL) communication;
means for refraining, based on an absence of a channel access parameter in the first DCI, from performing a clear channel assessment (CCA); and
means for transmitting, to the BS over a shared frequency band, the UL communication without performing the CCA.
75. The UE of clause 74, further comprising:
means for monitoring for a second DCI indicating a time resource of a BS-initiated channel occupancy time (COT); and
wherein the means for transmitting the UL communication comprises:
means for transmitting, based on the monitoring for the second DCI and a type of the UL communication, the UL communication.
76. The UE of clause 75, wherein:
the UL communication includes a UL control signal,
the means for transmitting the UL communication is further based on a transmission power configuration, and
the transmission power configuration is based on the monitoring for the second DCI.
77. The UE of clause 75, wherein:
the UL communication is a UL data communication,
the means for transmitting the UL communication comprises means for transmitting the UL data communication in the BS-initiated COT.
78. A base station (BS), comprising:
means for transmitting, to a user equipment (UE), an indication of a first clear channel assessment (CCA) timing configuration;
means for transmitting, to the UE, first downlink control information (DCI) scheduling an uplink (UL) communication;
means for transmitting, to the UE, a request to perform a CCA associated with a second CCA timing configuration; and
means for receiving, from the UE, the UL communication in a time resource, wherein the time resource is associated with the first CCA timing configuration.
79. The BS of clause 78, wherein:
the second CCA timing configuration is based on a random counter value,
the first CCA timing configuration is based on a non-random counter value,
the BS further includes:
means for determining, based on the non-random counter value, a duration of the CCA.
80. The BS of clause 79, wherein the non-random counter value is one of:
a statically-configured counter value; or
a semi-statically configured value.
81. The BS of clause 80, wherein the means for transmitting the indication of the first CCA timing configuration includes means for transmitting the DCI scheduling the UL communication, wherein the DCI includes a channel access filed indicating the non-random counter value.
82. The BS of clause 78, further comprising:
means for transmitting, to the UE, an indication to change to the first CCA timing configuration.
83. The BS of clause 82, wherein the means for transmitting the indication includes the means for transmitting the first DCI.
84. The BS of clause 83, wherein the first DCI indicates:
the request to perform the CCA; and
the indication to change to the first CCA timing configuration.

85. The BS of clause 83, wherein the indication to change to the first CCA timing configuration is based on an absence of a channel access parameter in the first DCI.

86. The BS of clause 82, wherein the means for transmitting the indication comprises means for transmitting a second DCI different from the first DCI, wherein the second DCI indicates a time resource associated with a BS-initiated channel occupancy time (COT), and wherein the means for receiving the UL communication comprises means for receiving the UL communication in the BS-initiated COT.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

receiving a first downlink control information (DCI) scheduling an uplink (UL) communication;

receiving a request to perform a clear channel assessment (CCA) associated with a first CCA timing configuration;

performing, based on an indication to change to a second CCA timing configuration different from the first CCA timing configuration, the CCA based on the second CCA timing configuration; and transmitting, based on the CCA, the UL communication.

2. The method of claim 1, wherein:

the first CCA timing configuration is based on a random counter value, the indication comprises an indication of a non-random counter value, and the method further comprises:

determining, based on the non-random counter value, a duration of the CCA.

3. The method of claim 2, wherein the non-random counter value is one of:

a statically-configured counter value; or a semi-statically configured value.

4. The method of claim 1, further comprising:

receiving, from a network entity, a downlink (DL) communication comprising the indication to change to the second CCA timing configuration.

5. The method of claim 4, wherein the first DCI indicates:

the request to perform the CCA associated with the first CCA timing configuration; and the indication to change to the second CCA timing configuration.

6. The method of claim 4, wherein the indication to change to the second CCA timing configuration is based on an absence of a channel access parameter in the first DCI.

7. The method of claim 4, wherein the receiving the DL communication comprises receiving a second DCI different from the first DCI, wherein the second DCI indicates a time resource associated with a network entity-initiated channel occupancy time (COT), and wherein the transmitting the UL communication comprises transmitting the UL communication in the network entity-initiated COT.

8. The method of claim 4, wherein the performing the CCA is based on a time gap between a first time resource of the DL communication and a second time resource of the UL communication.

9. A method of wireless communication performed by a user equipment (UE), the method comprising:

receiving a first downlink control information (DCI) scheduling an uplink (UL) communication;

refraining, based on an absence of a channel access parameter in the first DCI, from performing a clear channel assessment (CCA); and transmitting, over a shared frequency band, the UL communication without performing the CCA.

10. The method of claim 9, further comprising:

monitoring for a second DCI indicating a time resource of a network entity-initiated channel occupancy time (COT); and wherein the transmitting the UL communication comprises:

transmitting, based on the monitoring for the second DCI and a type of the UL communication, the UL communication.

11. The method of claim 10, wherein:

the UL communication comprises a UL control signal, the transmitting the UL communication is further based on a transmission power configuration, and the transmission power configuration is based on the monitoring for the second DCI.

12. The method of claim 10, wherein:

the UL communication is a UL data communication, and the transmitting the UL communication comprises transmitting the UL data communication in the network entity-initiated COT.

13. A method of wireless communication performed by a network entity, the method comprising:

transmitting, to a user equipment (UE), an indication of a first clear channel assessment (CCA) timing configuration;

transmitting, to the UE, a first downlink control information (DCI) scheduling an uplink (UL) communication;

transmitting, to the UE, a request to perform a CCA associated with a second CCA timing configuration; and receiving, from the UE, the UL communication in a time resource, wherein the time resource is associated with the first CCA timing configuration.

14. The method of claim 13, wherein:

the second CCA timing configuration is based on a random counter value, the first CCA timing configuration is based on a non-random counter value, and the method further comprising:

determining, based on the non-random counter value, a duration of the CCA.

15. The method of claim 14, wherein the non-random counter value is one of:

a statically-configured counter value; or a semi-statically configured value.

16. The method of claim 14, wherein the transmitting the indication of the first CCA timing configuration comprises transmitting the first DCI scheduling the UL communication, and wherein the first DCI comprises a channel access field indicating the non-random counter value.

17. The method of claim 13, further comprising:

transmitting, to the UE, an indication to change to the first CCA timing configuration.

18. The method of claim 17, wherein the transmitting the first DCI further comprises transmitting the indication.

19. The method of claim 17, wherein the first DCI indicates:

the request to perform the CCA; and the indication to change to the first CCA timing configuration.

20. The method of claim 17, wherein the indication to change to the first CCA timing configuration is based on an absence of a channel access parameter in the first DCI.

21. The method of claim 17, wherein the transmitting the indication comprises transmitting a second DCI different from the first DCI, wherein the second DCI indicates a time resource associated with a network entity-initiated channel occupancy time (COT), and wherein the receiving the UL communication comprises receiving the UL communication in the network entity-initiated COT.

22. A user equipment (UE), comprising:

a transceiver; and a processor in communication with the transceiver and configured to:

cause the transceiver to:

receive a first downlink control information (DCI) scheduling an uplink (UL) communication;

receive a request to perform a clear channel assessment (CCA) associated with a first CCA timing configuration;

perform, based on an indication to change to a second CCA timing configuration different from the first CCA timing configuration, the CCA based on the second CCA timing configuration; and transmit, based on the CCA, the UL communication.

23. The UE of claim 22, wherein:

the first CCA timing configuration is based on a random counter value, the indication comprising an indication of a non-random counter value, and the processor is further configured to:

determine, based on the non-random counter value, a duration of the CCA.

24. The UE of claim 22, wherein the processor is configured to cause the transceiver to:

receive, from a network entity, a downlink (DL) communication comprising the indication to change to the second CCA timing configuration.

25. The UE of claim 24, wherein the processor configured to cause the transceiver to receive the first DCI is further configured to cause the transceiver to receive the DL communication.

26. The UE of claim 24, wherein the first DCI indicates:

the request to perform the CCA associated with the first CCA timing configuration; and the indication to change to the second CCA timing configuration.

27. The UE of claim 24, wherein the indication to change to the second CCA timing configuration is based on an absence of a channel access parameter in the first DCI.

28. The UE of claim 24, wherein:

the processor configured to cause the transceiver to receive the DL communication comprises the processor configured to cause the transceiver to receive a second DCI different from the first DCI, the second DCI indicates a time resource associated with a network entity-initiated channel occupancy time (COT), and the processor is configured to cause the transceiver to transmit the UL communication in the network entity-initiated COT.

29. The UE of claim 24, wherein the processor is configured to perform the CCA based on a time gap between a first time resource of the DL communication and a second time resource of the UL communication.

30. The UE of claim 22, wherein the first DCI scheduling the UL communication includes a channel access field indicating a non-random counter value for a CCA timing configuration.

* * * * *